United States Patent
Tran

(10) Patent No.: US 12,548,267 B2
(45) Date of Patent: Feb. 10, 2026

(54) TECHNIQUES FOR USING 3-D AVATARS IN AUGMENTED REALITY MESSAGING

(71) Applicant: Snap Inc., Santa Monica, CA (US)

(72) Inventor: Lien Le Hong Tran, Santa Monica, CA (US)

(73) Assignee: Snap Inc., Santa Monica, CA (US)

( * ) Notice: Subject to any disclaimer, the term of this patent is extended or adjusted under 35 U.S.C. 154(b) by 270 days.

(21) Appl. No.: 18/310,282

(22) Filed: May 1, 2023

(65) Prior Publication Data

US 2024/0371106 A1 Nov. 7, 2024

(51) Int. Cl.
*G06T 19/00* (2011.01)
*G06T 13/40* (2011.01)
*G10L 13/08* (2013.01)
*H04L 51/10* (2022.01)

(52) U.S. Cl.
CPC ............ *G06T 19/006* (2013.01); *G06T 13/40* (2013.01); *G10L 13/08* (2013.01); *H04L 51/10* (2013.01)

(58) Field of Classification Search
CPC ....... G06T 19/00; G06T 19/006; G06T 13/20; G06T 13/40; H04L 51/00; H04L 51/10; H04L 51/043; H04L 51/04
See application file for complete search history.

(56) References Cited

U.S. PATENT DOCUMENTS

| | | | |
|---|---|---|---|
| 5,604,843 A | 2/1997 | Shaw et al. | |
| 5,689,559 A | 11/1997 | Park | |
| 5,880,731 A | 3/1999 | Liles et al. | |
| 6,023,270 A | 2/2000 | Brush, II et al. | |
| RE36,919 E | 10/2000 | Park | |
| RE37,052 E | 2/2001 | Park | |
| 6,223,165 B1 | 4/2001 | Lauffer | |
| 6,650,793 B1 | 11/2003 | Lund et al. | |

(Continued)

FOREIGN PATENT DOCUMENTS

| | | |
|---|---|---|
| CN | 109863532 A | 6/2019 |
| CN | 110168478 A | 8/2019 |

(Continued)

OTHER PUBLICATIONS

Mixamo Website, Jun. 2, 2016 WayBack Machine SnapShot (Year: 2016).*

(Continued)

*Primary Examiner* — Kee M Tung
*Assistant Examiner* — Thang Gia Huynh
(74) *Attorney, Agent, or Firm* — Schwegman Lundberg & Woessner, P.A.

(57) ABSTRACT

Described herein are techniques for facilitating the communication of text-based messages between end-users who are using messaging applications executing on client-based computing devices with different capabilities. Specifically, the messaging system described herein enables a first end-user to add a message element to a text-based message, which, when received by a message recipient using an augmented reality messaging application, will cause a 3-D avatar representing the message sender, to animate in accordance with a specific avatar animation associated with the message element. The message element may be an emoji, or a special sequence of characters, and may be a visible or invisible (e.g., meta-data) element of the text-based message.

20 Claims, 18 Drawing Sheets

(56) References Cited

U.S. PATENT DOCUMENTS

| | | |
|---|---|---|
| 6,772,195 B1 | 8/2004 | Hatlelid et al. |
| 6,804,417 B1 | 10/2004 | Lund et al. |
| 6,842,779 B1 | 1/2005 | Nishizawa |
| 7,342,587 B2 | 3/2008 | Danzig et al. |
| 7,468,729 B1 | 12/2008 | Levinson |
| 7,636,755 B2 | 12/2009 | Blattner et al. |
| 7,639,251 B2 | 12/2009 | Gu et al. |
| 7,775,885 B2 | 8/2010 | Van Luchene et al. |
| 7,859,551 B2 | 12/2010 | Bulman et al. |
| 7,885,931 B2 | 2/2011 | Seo et al. |
| 7,925,703 B2 | 4/2011 | Dinan et al. |
| 8,088,044 B2 | 1/2012 | Tchao et al. |
| 8,095,878 B2 | 1/2012 | Bates et al. |
| 8,108,774 B2 | 1/2012 | Finn et al. |
| 8,117,281 B2 | 2/2012 | Robinson et al. |
| 8,130,219 B2 | 3/2012 | Fleury et al. |
| 8,146,005 B2 | 3/2012 | Jones et al. |
| 8,151,191 B2 | 4/2012 | Nicol |
| RE43,993 E | 2/2013 | Park |
| 8,384,719 B2 | 2/2013 | Reville et al. |
| RE44,054 E | 3/2013 | Kim |
| RE44,068 E | 3/2013 | Park |
| RE44,106 E | 3/2013 | Park |
| 8,396,708 B2 | 3/2013 | Park et al. |
| RE44,121 E | 4/2013 | Park |
| 8,425,322 B2 | 4/2013 | Gillo et al. |
| 8,458,601 B2 | 6/2013 | Castelli et al. |
| 8,462,198 B2 | 6/2013 | Lin et al. |
| 8,484,158 B2 | 7/2013 | Deluca et al. |
| 8,495,503 B2 | 7/2013 | Brown et al. |
| 8,495,505 B2 | 7/2013 | Smith et al. |
| 8,504,926 B2 | 8/2013 | Wolf |
| 8,559,980 B2 | 10/2013 | Pujol |
| 8,564,621 B2 | 10/2013 | Branson et al. |
| 8,564,710 B2 | 10/2013 | Nonaka et al. |
| 8,581,911 B2 | 11/2013 | Becker et al. |
| 8,597,121 B2 | 12/2013 | Andres del Valle |
| 8,601,051 B2 | 12/2013 | Wang |
| 8,601,379 B2 | 12/2013 | Marks et al. |
| 8,632,408 B2 | 1/2014 | Gillo et al. |
| 8,648,865 B2 | 2/2014 | Dawson et al. |
| 8,659,548 B2 | 2/2014 | Hildreth |
| 8,683,354 B2 | 3/2014 | Khandelwal et al. |
| 8,692,830 B2 | 4/2014 | Nelson et al. |
| 8,810,513 B2 | 8/2014 | Ptucha et al. |
| 8,812,171 B2 | 8/2014 | Filev et al. |
| 8,832,201 B2 | 9/2014 | Wall |
| 8,832,552 B2 | 9/2014 | Arrasvuori et al. |
| 8,839,327 B2 | 9/2014 | Amento et al. |
| 8,890,926 B2 | 11/2014 | Tandon et al. |
| 8,892,999 B2 | 11/2014 | Nims et al. |
| 8,924,250 B2 | 12/2014 | Bates et al. |
| 8,963,926 B2 | 2/2015 | Brown et al. |
| 8,989,786 B2 | 3/2015 | Feghali |
| 9,086,776 B2 | 7/2015 | Ye et al. |
| 9,105,014 B2 | 8/2015 | Collet et al. |
| 9,241,184 B2 | 1/2016 | Weerasinghe |
| 9,256,860 B2 | 2/2016 | Herger et al. |
| 9,298,257 B2 | 3/2016 | Hwang et al. |
| 9,314,692 B2 | 4/2016 | Konoplev et al. |
| 9,330,483 B2 | 5/2016 | Du et al. |
| 9,357,174 B2 | 5/2016 | Li et al. |
| 9,361,510 B2 | 6/2016 | Yao et al. |
| 9,378,576 B2 | 6/2016 | Bouaziz et al. |
| 9,402,057 B2 | 7/2016 | Kaytaz et al. |
| 9,412,192 B2 | 8/2016 | Mandel et al. |
| 9,460,541 B2 | 10/2016 | Li et al. |
| 9,489,760 B2 | 11/2016 | Li et al. |
| 9,503,845 B2 | 11/2016 | Sundar Amalan |
| 9,508,197 B2 | 11/2016 | Quinn et al. |
| 9,532,364 B2 | 12/2016 | Fujito |
| 9,544,257 B2 | 1/2017 | Ogundokun et al. |
| 9,576,400 B2 | 2/2017 | Van Os et al. |
| 9,589,357 B2 | 3/2017 | Li et al. |
| 9,592,449 B2 | 3/2017 | Barbalet et al. |
| 9,648,376 B2 | 5/2017 | Chang et al. |
| 9,697,635 B2 | 7/2017 | Quinn et al. |
| 9,706,040 B2 | 7/2017 | Kadirvel et al. |
| 9,744,466 B2 | 8/2017 | Fujioka |
| 9,746,990 B2 | 8/2017 | Anderson et al. |
| 9,749,270 B2 | 8/2017 | Collet et al. |
| 9,792,714 B2 | 10/2017 | Li et al. |
| 9,839,844 B2 | 12/2017 | Dunstan et al. |
| 9,883,838 B2 | 2/2018 | Kaleal, III et al. |
| 9,898,849 B2 | 2/2018 | Du et al. |
| 9,911,073 B1 | 3/2018 | Spiegel et al. |
| 9,936,165 B2 | 4/2018 | Li et al. |
| 9,959,037 B2 | 5/2018 | Chaudhri et al. |
| 9,980,100 B1 | 5/2018 | Charlton et al. |
| 9,990,373 B2 | 6/2018 | Fortkort |
| 10,039,988 B2 | 8/2018 | Lobb et al. |
| 10,097,492 B2 | 10/2018 | Tsuda et al. |
| 10,116,598 B2 | 10/2018 | Tucker et al. |
| 10,155,168 B2 | 12/2018 | Blackstock et al. |
| 10,158,589 B2 | 12/2018 | Collet et al. |
| 10,242,477 B1 | 3/2019 | Charlton et al. |
| 10,242,503 B2 | 3/2019 | McPhee et al. |
| 10,262,250 B1 | 4/2019 | Spiegel et al. |
| 10,348,662 B2 | 7/2019 | Baldwin et al. |
| 10,362,219 B2 | 7/2019 | Wilson et al. |
| 10,432,559 B2 | 10/2019 | Baldwin et al. |
| 10,454,857 B1 | 10/2019 | Blackstock et al. |
| 10,475,225 B2 | 11/2019 | Park et al. |
| 10,504,266 B2 | 12/2019 | Blattner et al. |
| 10,573,048 B2 | 2/2020 | Ni et al. |
| 10,656,797 B1 | 5/2020 | Alvi et al. |
| 10,657,695 B2 | 5/2020 | Chand et al. |
| 10,657,701 B2 | 5/2020 | Osman et al. |
| 10,762,174 B2 | 9/2020 | Denton et al. |
| 10,802,683 B1 | 10/2020 | Griffin et al. |
| 10,805,248 B2 | 10/2020 | Luo et al. |
| 10,872,451 B2 | 12/2020 | Sheth et al. |
| 10,880,246 B2 | 12/2020 | Baldwin et al. |
| 10,895,964 B1 | 1/2021 | Grantham et al. |
| 10,896,534 B1 | 1/2021 | Smith et al. |
| 10,933,311 B2 | 3/2021 | Brody et al. |
| 10,938,758 B2 | 3/2021 | Allen et al. |
| 10,964,082 B2 | 3/2021 | Amitay et al. |
| 10,979,752 B1 | 4/2021 | Brody et al. |
| 10,984,575 B2 | 4/2021 | Assouline et al. |
| 10,992,619 B2 | 4/2021 | Antmen et al. |
| 11,010,022 B2 | 5/2021 | Alvi et al. |
| 11,030,789 B2 | 6/2021 | Chand et al. |
| 11,036,781 B1 | 6/2021 | Baril et al. |
| 11,063,891 B2 | 7/2021 | Voss |
| 11,069,103 B1 | 7/2021 | Blackstock et al. |
| 11,080,917 B2 | 8/2021 | Monroy-hernández et al. |
| 11,128,586 B2 | 9/2021 | Al Majid et al. |
| 11,188,190 B2 | 11/2021 | Blackstock et al. |
| 11,189,070 B2 | 11/2021 | Jahangiri et al. |
| 11,199,957 B1 | 12/2021 | Alvi et al. |
| 11,218,433 B2 | 1/2022 | Baldwin et al. |
| 11,229,849 B2 | 1/2022 | Blackstock et al. |
| 11,245,658 B2 | 2/2022 | Grantham et al. |
| 11,249,614 B2 | 2/2022 | Brody |
| 11,263,254 B2 | 3/2022 | Baril et al. |
| 11,270,491 B2 | 3/2022 | Monroy-Hernández et al. |
| 11,284,144 B2 | 3/2022 | Kotsopoulos et al. |
| 2002/0067362 A1 | 6/2002 | Agostino Nocera et al. |
| 2002/0169644 A1 | 11/2002 | Greene |
| 2005/0162419 A1 | 7/2005 | Kim et al. |
| 2005/0206610 A1 | 9/2005 | Cordelli |
| 2006/0294465 A1 | 12/2006 | Ronen et al. |
| 2007/0113181 A1 | 5/2007 | Blattner et al. |
| 2007/0168863 A1 | 7/2007 | Blattner et al. |
| 2007/0176921 A1 | 8/2007 | Iwasaki et al. |
| 2008/0158222 A1 | 7/2008 | Li et al. |
| 2008/0214253 A1 | 9/2008 | Gillo et al. |
| 2008/0215995 A1 | 9/2008 | Wolf |
| 2009/0016617 A1 | 1/2009 | Bregman-amitai et al. |
| 2009/0055484 A1 | 2/2009 | Vuong et al. |
| 2009/0070688 A1 | 3/2009 | Gyorfi et al. |
| 2009/0099925 A1 | 4/2009 | Mehta et al. |
| 2009/0106672 A1 | 4/2009 | Burstrom |

(56) References Cited

U.S. PATENT DOCUMENTS

| | | |
|---|---|---|
| 2009/0158170 A1 | 6/2009 | Narayanan et al. |
| 2009/0177976 A1 | 7/2009 | Bokor et al. |
| 2009/0202114 A1 | 8/2009 | Morin et al. |
| 2009/0265604 A1 | 10/2009 | Howard et al. |
| 2009/0300525 A1 | 12/2009 | Jolliff et al. |
| 2009/0303984 A1 | 12/2009 | Clark et al. |
| 2010/0011422 A1 | 1/2010 | Mason et al. |
| 2010/0023885 A1 | 1/2010 | Reville et al. |
| 2010/0115426 A1 | 5/2010 | Liu et al. |
| 2010/0162149 A1 | 6/2010 | Sheleheda et al. |
| 2010/0203968 A1 | 8/2010 | Gill et al. |
| 2010/0227682 A1 | 9/2010 | Reville et al. |
| 2011/0093780 A1 | 4/2011 | Dunn et al. |
| 2011/0115798 A1 | 5/2011 | Nayar et al. |
| 2011/0148864 A1 | 6/2011 | Lee et al. |
| 2011/0239136 A1 | 9/2011 | Goldman et al. |
| 2012/0113106 A1 | 5/2012 | Choi et al. |
| 2012/0124458 A1 | 5/2012 | Cruzada |
| 2012/0130717 A1 | 5/2012 | Xu et al. |
| 2013/0103760 A1 | 4/2013 | Golding et al. |
| 2013/0201187 A1 | 8/2013 | Tong et al. |
| 2013/0249948 A1 | 9/2013 | Reitan |
| 2013/0257877 A1 | 10/2013 | Davis |
| 2014/0043329 A1 | 2/2014 | Wang et al. |
| 2014/0055554 A1 | 2/2014 | Du et al. |
| 2014/0125678 A1 | 5/2014 | Wang et al. |
| 2014/0129343 A1 | 5/2014 | Finster et al. |
| 2015/0206349 A1 | 7/2015 | Rosenthal et al. |
| 2016/0134840 A1 | 5/2016 | Mcculloch |
| 2016/0234149 A1 | 8/2016 | Tsuda et al. |
| 2016/0301638 A1 | 10/2016 | Chen et al. |
| 2016/0359777 A1* | 12/2016 | Tucker ................ H04L 51/04 |
| 2017/0080346 A1 | 3/2017 | Abbas |
| 2017/0087473 A1 | 3/2017 | Siegel et al. |
| 2017/0113140 A1 | 4/2017 | Blackstock et al. |
| 2017/0118145 A1* | 4/2017 | Aittoniemi ............ H04L 51/04 |
| 2017/0199855 A1 | 7/2017 | Fishbeck |
| 2017/0235848 A1 | 8/2017 | Van Dusen et al. |
| 2017/0310934 A1 | 10/2017 | Du et al. |
| 2017/0312634 A1 | 11/2017 | Ledoux et al. |
| 2018/0047200 A1 | 2/2018 | O'hara et al. |
| 2018/0113587 A1 | 4/2018 | Allen et al. |
| 2018/0115503 A1 | 4/2018 | Baldwin et al. |
| 2018/0185757 A1 | 7/2018 | Miller et al. |
| 2018/0198743 A1 | 7/2018 | Blackstock et al. |
| 2018/0315076 A1 | 11/2018 | Andreou |
| 2018/0315133 A1 | 11/2018 | Brody et al. |
| 2018/0315134 A1 | 11/2018 | Amitay et al. |
| 2019/0001223 A1 | 1/2019 | Blackstock et al. |
| 2019/0004618 A1 | 1/2019 | Tadros et al. |
| 2019/0057616 A1 | 2/2019 | Cohen et al. |
| 2019/0097958 A1 | 3/2019 | Collet et al. |
| 2019/0188920 A1 | 6/2019 | Mcphee et al. |
| 2019/0280997 A1 | 9/2019 | Baldwin et al. |
| 2019/0295056 A1* | 9/2019 | Wright ................... H04L 51/52 |
| 2019/0340419 A1 | 11/2019 | Milman et al. |
| 2019/0362557 A1 | 11/2019 | Lacey et al. |
| 2020/0306637 A1 | 10/2020 | Baldwin et al. |
| 2020/0357399 A1 | 11/2020 | Devaraj et al. |
| 2020/0372127 A1 | 11/2020 | Denton et al. |
| 2020/0410575 A1 | 12/2020 | Grantham et al. |
| 2021/0074047 A1 | 3/2021 | Sheth et al. |
| 2021/0089179 A1 | 3/2021 | Grantham et al. |
| 2021/0104087 A1 | 4/2021 | Smith et al. |
| 2021/0168108 A1 | 6/2021 | Antmen et al. |
| 2021/0170270 A1 | 6/2021 | Brody et al. |
| 2021/0192823 A1 | 6/2021 | Amitay et al. |
| 2021/0192824 A1* | 6/2021 | Chen ...................... G06F 16/43 |
| 2021/0209825 A1 | 7/2021 | Assouline et al. |
| 2021/0225058 A1 | 7/2021 | Chand et al. |
| 2021/0240315 A1 | 8/2021 | Alvi et al. |
| 2021/0243482 A1 | 8/2021 | Baril et al. |
| 2021/0243503 A1 | 8/2021 | Kotsopoulos et al. |
| 2021/0266277 A1 | 8/2021 | Allen et al. |
| 2021/0281897 A1 | 9/2021 | Brody et al. |
| 2021/0285774 A1 | 9/2021 | Collins et al. |
| 2021/0306290 A1 | 9/2021 | Voss |
| 2021/0306451 A1 | 9/2021 | Heikkinen et al. |
| 2021/0385180 A1 | 12/2021 | Al Majid et al. |
| 2021/0392460 A1* | 12/2021 | Gorkin ................ H04W 4/029 |
| 2021/0405831 A1 | 12/2021 | Mourkogiannis et al. |
| 2021/0409535 A1 | 12/2021 | Mourkogiannis et al. |
| 2022/0012929 A1 | 1/2022 | Blackstock et al. |
| 2022/0191157 A1* | 6/2022 | Lee ........................ H04L 51/063 |
| 2022/0410006 A1 | 12/2022 | Watanabe |
| 2023/0026498 A1 | 1/2023 | Wright |
| 2023/0117304 A1 | 4/2023 | Sears et al. |
| 2023/0130535 A1 | 4/2023 | Ma et al. |
| 2023/0308610 A1 | 9/2023 | Henderson et al. |
| 2024/0029332 A1 | 1/2024 | Willardson et al. |
| 2024/0372822 A1 | 11/2024 | Tran |

FOREIGN PATENT DOCUMENTS

| | | |
|---|---|---|
| EP | 2184092 A2 | 5/2010 |
| JP | 2001230801 A | 8/2001 |
| JP | 5497931 B2 | 3/2014 |
| KR | 101445263 B1 | 9/2014 |
| WO | WO-2003094072 A1 | 11/2003 |
| WO | WO-2004095308 A1 | 11/2004 |
| WO | WO-2006107182 A1 | 10/2006 |
| WO | WO-2007134402 A1 | 11/2007 |
| WO | WO-2012139276 A1 | 10/2012 |
| WO | WO-2013027893 A1 | 2/2013 |
| WO | WO-2013152454 A1 | 10/2013 |
| WO | WO-2013166588 A1 | 11/2013 |
| WO | WO-2014031899 A1 | 2/2014 |
| WO | WO-2014194439 A1 | 12/2014 |
| WO | WO-2016090605 A1 | 6/2016 |
| WO | WO-2018081013 A1 | 5/2018 |
| WO | WO-2018102562 A1 | 6/2018 |
| WO | WO-2018129531 A1 | 7/2018 |
| WO | WO-2019089613 A1 | 5/2019 |
| WO | WO-2024228868 A1 | 11/2024 |
| WO | WO-2024228886 A1 | 11/2024 |

OTHER PUBLICATIONS

"U.S. Appl. No. 18/141,851, Examiner Interview Summary mailed Mar. 14, 2025", 2 pgs.

"U.S. Appl. No. 18/141,851, Non Final Office Action mailed Feb. 25, 2025", 47 pgs.

"Bitmoji", Snapchat Support, [Online] Retrieved from the Internet: <URL: https://web.archive.org/web/20190503063620/https://support.snapchat.com/en-US/a/bitmoji>, (captured May 3, 2019), 2 pgs.

"Bitmoji Chrome Extension", [Online] Retrieved from the Internet: <URL: https://web.archive.org/web/20200919024925/https://support.bimoji.com/hc/en-us/articles/360001494066>, (Sep. 19, 2020), 5 pgs.

"Bitmoji Customize text", [Online] Retrieved from the Internet: <URL: https://web.archive.org/web/20210225200456/https://support.bitmoji.com/hc/en-us/articles/360034632291-Customize-Text-on-Bitmoji-Stickers>, (captured Feb. 25, 2021), 3 pgs.

"Bitmoji Family", Snapchat Support, [Online] Retrieved from the Internet: <URL: https://web.archive.org/web/20190503063620/https://support.snapchat.com/en-US/article/bitmoji-family>, (captured May 3, 2019), 4 pgs.

"Instant Comics Starring You & Your Friends", Bitstrips Inc, [Online] Retrieved from the Internet: <URL: https://web.archive.org/web/20150206000940/http://company.bitstrips.com/bitstrips-app.html>, (captured Feb. 6, 2015), 3 pgs.

"International Application Serial No. PCT/US2024/025855, International Search Report mailed Jul. 11, 2024", 5 pgs.

"International Application Serial No. PCT/US2024/025855, Written Opinion mailed Jul. 11, 2024", 7 pgs.

"International Application Serial No. PCT/US2024/026033, International Search Report mailed Aug. 30, 2024", 4 pgs.

"International Application Serial No. PCT/US2024/026033, Written Opinion mailed Aug. 30, 2024", 6 pgs.

(56) References Cited

OTHER PUBLICATIONS

"Manage Your Bitmoji", Snapchat Support, [Online] Retrieved from the Internet: <URL: https://web.archive.org/web/20190503063620/https://support.snapchat.com/en-US/a/manage-bitmoji>, (captured May 3, 2019), 3 pgs.

"Your Own Personal Emoji", Bitstrips Inc, [Online] Retrieved from the Internet: <URL: https://web.archive.org/web/20150205232004/http://bitmoji.com/>, (captured Feb. 5, 2015), 3 pgs.

Carnahan, Daniel, "Snap is Offering Personalized Video Content Through Bitmoji TV", Business Insider, [Online] Retrieved from the Internet: <URL: https://www.businessinsider.com/snap-offers-personalized-video-content-through-bitmoji-tv-2019-12>, (2019), 10 pgs.

Constine, Josh, "Snapchat launches Bitmoji merch and comic strips starring your avatar", TechCrunch, [Online] Retrieved from the Internet: <URL: https://techcrunch.com/2018/11/13/bitmoji-store/>, (Nov. 13, 2018), 16 pgs.

Constine, Josh, "Snapchat Launches Bitmoji TV: Zany 4-min Cartoons of Your Avatar", TechCrunch, [Online] Retrieved from the Internet: <URL: https://techcrunch.com/2020/01/30/bitmoji-tv/>, (Jan. 30, 2020), 13 pgs.

Dzmitry, Tsetserukou, et al., "iFeel IM!: Augmenting Emotions during Online Communication", IEEE Computer Graphics and Applications, IEEE Service Center, New York, NY, US, vol. 30, No. 5,, (Sep. 1, 2010), 9 pgs.

International, An, et al., "Emotional Avatars: Appearance Augmentation and Animation based on Facial Expression Analysi", Internet Applied Mathematics & Information Sciences, [Online]. Retrieved from the Internet: <https://www.naturalspublishing.com/f iles/published/947g26k9xcj6vx.pdf>, (Apr. 1, 2015), 461-469.

MacMillan, Douglas, "Snapchat Buys Bitmoji App for More Than $100 Million", The Wallstreet Journal, [Online] Retrieved from the Internet: <URL: https://www.wsj.com/articles/snapchat-buys-bitmoji-app-for-more-than-100-million-1458876017>, (Mar. 25, 2016), 5 pgs.

Newton, Casey, "Your Snapchat friendships now have their own profiles- and merchandise", The Verge, [Online] Retrieved from the Internet: <URL: https://www.theverge.com/2018/11/13/18088772/snapchat-friendship-profiles-bitmoji-merchandise-comics>, (Nov. 13, 2018), 5 pgs.

Ong, Thuy, "Snapchat takes Bitmoji deluxe with hundreds of new customization options", The Verge, [Online] Retrieved from the Internet on Nov. 2, 2018: <URL: https://www.theverge.com/2018/1/30/16949402/bitmoji-deluxe-snapchat-customization>, (Jan. 30, 2018), 2 pgs.

Reign, Ashley, "How to Add My Friend's Bitmoji to My Snapchat", Women.com, [Online] Retrieved from the Internet: <URL: https://www.women.com/ashleyreign/lists/how-to-add-my-friends-bitmoji-to-my-snapchat>, (Jun. 30, 2017), 7 pgs.

Tumbokon, Karen, "Snapchat Update: How to Add Bitmoji to Customizable Geofilters", International Business Times, [Online] Retrieved from the Internet: <URL: https://www.ibtimes.com/snapchat-update-how-add-bitmoji-customizable-geofilters-2448152>, (Nov. 18, 2016), 6 pgs.

U.S. Appl. No. 18/141,851, filed May 1, 2023, Techniques for Using 3-D Avatars in Augmented Reality Messaging.

"U.S. Appl. No. 18/141,851, Notice of Allowance mailed Jun. 12, 2025", 12 pgs.

\* cited by examiner

TECHNIQUES FOR USING 3-D AVATARS IN AUGMENTED REALITY MESSAGING

FIELD

The present application relates to an online or Internet-enabled messaging system that facilitates messaging between end-users who are using messaging applications executing on different types of computing devices, including devices with augmented reality capabilities.

BACKGROUND

Augmented Reality (AR) devices, including AR glasses and AR headsets, are becoming increasingly popular due to their ability to provide end-users with an immersive and interactive experience. This immersive and interactive experience can enhance a variety of activities, including gaming, entertainment, education, training, and productivity. However, because AR devices are fundamentally different from traditional computing devices—specifically, the mechanisms by which an end-user may provide input(s) and receive output(s)—adapting existing software applications and systems for use with AR devices presents a variety of challenges.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which.

DETAILED DESCRIPTION

Figure 1:
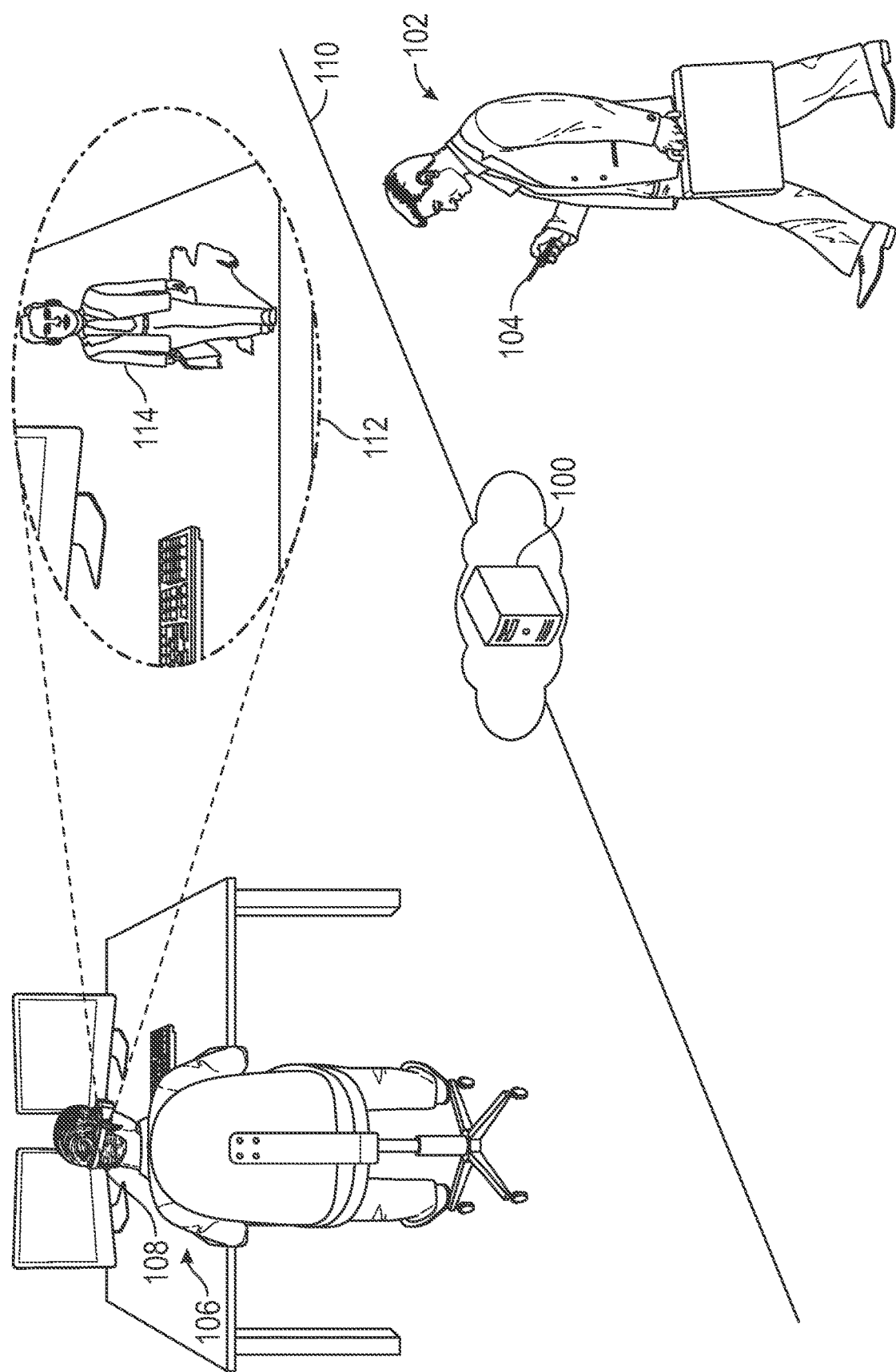
FIG. 1 is a diagram illustrating an example of two end-users exchanging messages via an improved messaging system, including a first end-user using a messaging application executing on a mobile computing device (e.g., a mobile phone), and a second end-user wearing an augmented reality (AR) device on which a messaging application is executing, according to some examples.

Described herein are techniques-including both systems and methods—for facilitating an exchange of text-based messages, using an improved messaging system, between end-users who are using messaging applications executing on different types of computing devices, with different capabilities. More specifically, the improved messaging system described herein facilitates an exchange of messages between two or more end-users, where at least one end-user is using a messaging application executing on a wearable, augmented reality (AR) device. Using a messaging application executing on the AR device, an end-user may send and receive messages by interacting with an avatar (e.g., a virtual object) representing another end-user, thereby creating an immersive and interactive messaging experience. In the following description, for purposes of explanation, numerous specific details and features are set forth in order to provide a thorough understanding of the various aspects of different examples. It will be evident, however, to one skilled in the art, that the present invention may be practiced and/or implemented with varying combinations of the many details and features presented herein.

Wearable AR devices—including AR glasses and AR headsets—can provide end-users with an immersive experience by blending virtual objects with views of the real-world environment. However, adapting existing software applications, systems and services for use with AR devices can be technically challenging. Consider for example a messaging application. A messaging application developed for conventional computing devices (e.g., mobile phones, desktop and laptop computers, etc.) will generally leverage a physical keyboard, or touchscreen display, via which an end-user can provide text-based input to the computing device and messaging application. Accordingly, an end-user can easily use his or her fingers, or a stylus, to type a text-based message for sending to another end-user via the messaging system. Furthermore, a received message is presented via a conventional display device of the computing device at which the message was received.

Unlike conventional computing devices, a wearable AR device does not have the same user input and output mechanisms. Instead, AR devices receive input via simple buttons, audible or voice commands, hand-based gestures, and in some instances custom hand-operated controllers. Generally, the input mechanisms are not well-suited for receiving text-based input. Furthermore, AR devices typically use some type of transparent or see-though display device, in order to overlay virtual objects or virtual content onto the end-user's view of the real-world environment. Therefore, if the same two-dimensional user interface that is used with a messaging application for a conventional mobile computing device is simply scaled for presentation via the display device of an AR device, the end-user experience will be far from interactive or immersive, as the user interface is likely to block a significant portion of the view of the real-world environment, providing little if any benefit to using the messaging application with the AR device.

To address these and other issues, an improved messaging system and application are presented herein. The messaging system is backwards compatible with existing messaging systems, providing end-users who opt to use AR devices with the ability to communicate with other end-users who are using conventional computing devices, such as mobile phones, desktop or laptop computing devices, and so forth. However, instead of simply presenting a two-dimensional user interface "floating" in AR space, as presented by a display device of an AR device, the improved messaging application for the AR device allows the end-user to interact with another end-user of the messaging system via a 3-D avatar that represents the other end-user. Using the AR device, a 3-D avatar of another end-user can be anchored or pinned in a specific location of a real-world environment.

For example, the messaging application for the AR device allows the end-user of the AR device to access and view 3-D avatars of other end-users, where each 3-D avatar is a digital representation of another end-user of the messaging service, configured by the other end-user. The end-user of the AR device may access a contact list, sometimes referred to as a buddy list or friend list, to view other end-users, and then select a specific contact or friend from the list. Upon making a selection, a 3-D avatar representing the selected end-user is presented via the display device of the AR device. The end-user of the AR device can then anchor or pin the 3-D avatar of the other end-user to a position in space in the real-world environment, creating an AR space in which the 3-D avatar will be presented. As such, the end-user of the AR device may position one or more avatars in various real-world locations where the end-user is most likely to be when communicating with another end-user that is represented by an avatar. For example, if an end-user tends to communicate via a messaging application with a specific friend when the end-user is in his or her kitchen, that end-user may want to anchor or pin the 3-D avatar of the friend to a position in AR space that represents a location on a countertop in his or her kitchen. Then, when the end-user is in the kitchen and wearing the AR device, the end-user will be able to view a 3-D avatar representing his or her friend and interact with his or her friend via the 3-D avatar. Similarly, an end-user may anchor or pin the avatars of one or more coworkers or colleagues to his or her desktop, so that when the end-user is working at his or her desk and wearing an AR device, the end-user can easily interact with his or her coworkers via their representative 3-D avatars.

In some examples, after a 3-D avatar of another end-user has been anchored or pinned within an AR space, the positioning of the 3-D avatar is persisted across messaging sessions. For example, if the end-user of the messaging application for the AR device leaves the real-world environment associated with the AR space in which the 3-D avatar has been anchored, when the end-user returns at a later time to the real-world environment, the AR device will perform what is referred to as a relocalization process. During relocalization, the AR device uses computer vision algorithms and image analysis to recognize objects in the real-world environment so that it can associate the AR space with the real-world environment and once again render virtual content associated with an AR space that has been created for that real-world environment. Specifically, upon determining that the AR device is once again located in a real-world environment in which an end-user has previously anchored or pinned an avatar, the AR device will once again render the 3-D avatar(s), in the same location or position in AR space as previously anchored or pinned.

In some examples, the messaging system provides improved presence and activity detection and status indicators. For example, the messaging application executing on each client computing device may periodically communicate presence or status data and/or activity data to the server executing the messaging system, so that the messaging system can provide each end-user with detailed status information about other end-users. Specifically, when an end-user of a messaging application executing on an AR device is wearing the AR device and online with respect to the messaging service, other end-users may receive updates to their messaging application user interface to reflect the status of the end-user. Moreover, if a first end-user wearing an AR device is in a real-world environment associated with AR space in which a 3-D avatar of a second end-user has been anchored or pinned, the second end-user may receive a status indicator via the messaging application that specifically indicates that his or her 3-D avatar is currently viewable by the first end-user. As such, the second end-user will understand that any message communicated by the second end-user to the first end-user will be conveyed to the first end-user via the 3-D avatar. This makes it possible for the second end-user to author content that is best suited for a message recipient using an AR device.

Consistent with some examples, messages communicated to an end-user of a messaging application executing on an AR device may include specific characters, or symbols (e.g., emoji), which map to avatar animations. Accordingly, a first end-user may send a message to a second end-user, wearing an AR device, which will cause an avatar of the first end-user, as viewed by the second end-user, to move in accordance with a specific avatar animation that corresponds with a specific character or symbol included in the message sent from the first end-user to the second end-user. For instance, in one example, a message sender may include a special sequence of characters-such as, "/w" or "::w"— where some subset of initial characters denote that the sequence of characters is intended as a special command or instruction for animating an avatar, and the subsequent character or characters identify a specific avatar animation. In this example, the "w" may be short for "wave" and as such, the special sequence of characters (e.g., "/w" or "::w") will cause the 3-D avatar of the message sender to perform an avatar animation by waving to the message recipient—that is, the end-user who is viewing the 3-D avatar via the AR device. In another example, some subset of emojis may correspond with, or map to, avatar animations. As an example, the very popular smiling emoji, when sent in a message to an end-user who is using a messaging application executing on an AR device, may cause a 3-D avatar of the message sender to smile as a result of performing an avatar animation that is associated with the smiling emoji. Other innovative aspects and advantages of the various embodiments of the present invention will be readily apparent from the descriptions of the various figures that follow.

FIG. 1 is a diagram illustrating an example of two end-users exchanging messages via an improved server-based messaging system 100, including a first end-user 102 who is using a messaging application executing on a mobile computing device 104 (e.g., a mobile phone), and a second end-user 106 wearing an AR device 108 on which a messaging application is executing. In this example, the line with reference number 110 is intended to convey a physical separation of the two end-users. Specifically, the first end-user 102 is shown to be present in a first, real-world environment, distant from the second real-world environment in which the second end-user is present. The exchange of messages between the client computing devices (e.g., mobile phone 104 and AR device 108) of the two end-users is facilitated by the server-based messaging system 100, with which the respective client computing devices are wirelessly connected.

Consistent with some examples, a messaging application executing on the AR device 108 allows the end-user 106 to anchor or pin a 3-D avatar, representing another end-user of the messaging service, in an AR space associated with a real-world environment of the first end user's choosing. For instance, as illustrated in FIG. 1, the end-user 106 of the AR device 108 is looking at the right edge of his desktop, where the end-user has anchored or pinned a 3-D avatar 114, representing the end-user 102 of the mobile phone 104. As shown in FIG. 1, the 3-D avatar 114 is present in the view of AR space 112 (e.g., as presented via the display device of the AR device 108), as the 3-D avatar 114 is a virtual object that is not actually present as a real-world object in the physical, real-world environment. In this example, the two end-users may be coworkers or colleagues, and thus, the end-user 106 of the AR device 108 may frequently send messages to the end-user 102 of the mobile phone 104, when the end-user 106 is sitting at his or her desk, actively engaged in various work tasks. Accordingly, by anchoring or pinning the 3-D avatar 114 of the coworker or colleague (e.g., end-user 102) to the desktop, each time the end-user 106 of the AR device 108 sits at his or her desk wearing the AR device 108, the end-user 106 will be able to interact with his or her colleague (e.g., end-user 102) via the messaging application and the 3-D avatar 114.

As illustrated in FIG. 1, the AR device 108 is presenting an augmented view of reality to the end-user 106. This view, referred to herein as an AR view, is represented by the dashed oval with reference number 112. For example, the end-user is shown to be looking toward the right edge of the desktop. The portion of FIG. 1 enclosed in the dashed oval 112, is the AR view of the desktop, as generated by the AR device 108 and presented to the end-user 106. In this example AR view 112, the 3-D avatar 114 representing the colleague or coworker (e.g., end-user 102) appears positioned atop the flat surface provided by the desktop, as if the 3-D avatar 114 is standing on the desktop. In this instance, the 3-D avatar 114 is a digital representation of another end-user 102 with whom messages are being exchanged. For instance, consistent with some examples, the 3-D avatar 114 was created by the end-user 102 of the mobile phone 104. Prior to initiating a messaging session with the distant end-user 102, the end-user 106 wearing the AR device 108 may use a messaging application executing on the AR device 108 to place or position the 3-D avatar 114 of the end-user 102 on his or her desktop—an AR operation that is generally referred to as or "anchoring" or "pinning" a virtual object. Once the 3-D avatar has been anchored or pinned, a digital representation of the real-world environment is created. This digital representation is referred to as an AR space. Accordingly, when the end-user 106 is present in the real-word environment that corresponds with the AR space in which the 3-D avatar 114 has been anchored, the anchored 3-D avatar 114 will be presented and will appear in the AR view 112 of the AR space as generated by the AR device 108.

Consistent with some examples, when the end-user 102 using the mobile phone 104 prepares a text-based message for sending to the end-user 106 wearing the AR device 108, the end-user 102 may add to the message an instruction or command that will cause the 3-D avatar 114 presented via the AR device 108 to animate in a specific manner. Accordingly, the text-based message may be presented in a chat bubble displayed next to or near (e.g., proximate) the 3-D avatar 114, while the 3-D avatar 113 performs the movement of the animation. The instruction or command that is added to the message, which ultimately causes the 3-D avatar to animate, may be a special character or sequence of characters, or a symbol (e.g., an emoji). The messaging system 100 upon receiving the incoming text-based message intended for the end-user of the AR device, will interpret the emoji or special sequence of characters as a command or instruction to modify the presentation of the 3-D avatar 114, for example, by animating the presentation of the avatar 114 in accordance with a specific avatar animation that corresponds with the command or instruction. In one example, avatar animations may be mapped to specific sequences of characters. In another example, avatar animations may be mapped to emojis. In some examples, the command or instruction for the avatar animation may be a visible message element, such that the command appears in the original message as sent. However, in other instances, the message sender may specify an avatar animation, such that the command or instruction is communicated as meta-data, and not as a visible message element (e.g., as part of the body of the actual text-based message). For instance, in one example, a user interface presented via the messaging application may provide a special collection of icons, with each icon representing a specific avatar animation. Selecting an icon or graphic may result in a command or instruction being added, as meta-data, to a message that is being sent. Furthermore, a message sender may be able to select an icon to preview the avatar animation before adding the instruction to the message.

Each avatar animation that maps to an emoji or special sequence of characters may be embodied as a file, in a video file format that, when processed by the AR device, will cause the corresponding avatar animation to be presented via the display device of the AR device 108. In some examples, an avatar animation may include an audio component, such that the 3-D avatar delivers a spoken message as part of the avatar animation. In other instances, the text-based message may be converted to an audio message such that the 3-D avatar speaks the audio message to the message recipient wearing the AR device. For example, the 3-D avatar may speak the audio message before, after, or in some instances, during the presentation of the avatar animation—that is, while the media file for the avatar animation is being processed and presented.

Generally, each avatar animation may be consistent with a human, or perhaps super-human, movement. For instance, an avatar animation may be or include a brief facial expression (e.g., smiling, frowning, expressing amusement, expressing excitement, expressing disbelief, or expressing dismay). Similarly, in some examples, an avatar animation may involve the avatar striking a specific pose or making a specific bodily movement or gesture (e.g., jumping up and down, pumping a fist, waving with one or both arms, and performing a military style salute). In yet another example, an avatar animation may include an action performed with a prop, for example, swinging a baseball bat, bouncing a basketball, and so forth.

Consistent with some examples, some avatar animations may be selectable by a message sender, only when the message sender is in a specific geographical area, or when the message sender is in a location at which a particular event is occurring. For instance, the messaging system may utilize the location data generated by the client computing devices on which the messaging applications are executing. Using this location data, and by querying a database of known events (e.g., live performances, sporting events, and so forth), the messaging system can make specific avatar animations available based on time and location data. As such, a message sender may select a specific avatar animation that is associated with a current location or event that is being attended, so as to convey the message sender's current location or activity to the message recipient.

As described in greater detail below, the messaging system may be one component in a broader interaction system that facilitates a variety of different types of interactions, where text-based messaging is just one type of interaction. When implemented as part of an interaction system, each client-based messaging application may be just one of several different client applications, where each client application leverages some core functionality that is provided by an interaction client. Details of such a system are provided below in connection with the description of FIG. 2.

Networked Computing Environment

Figure 2:
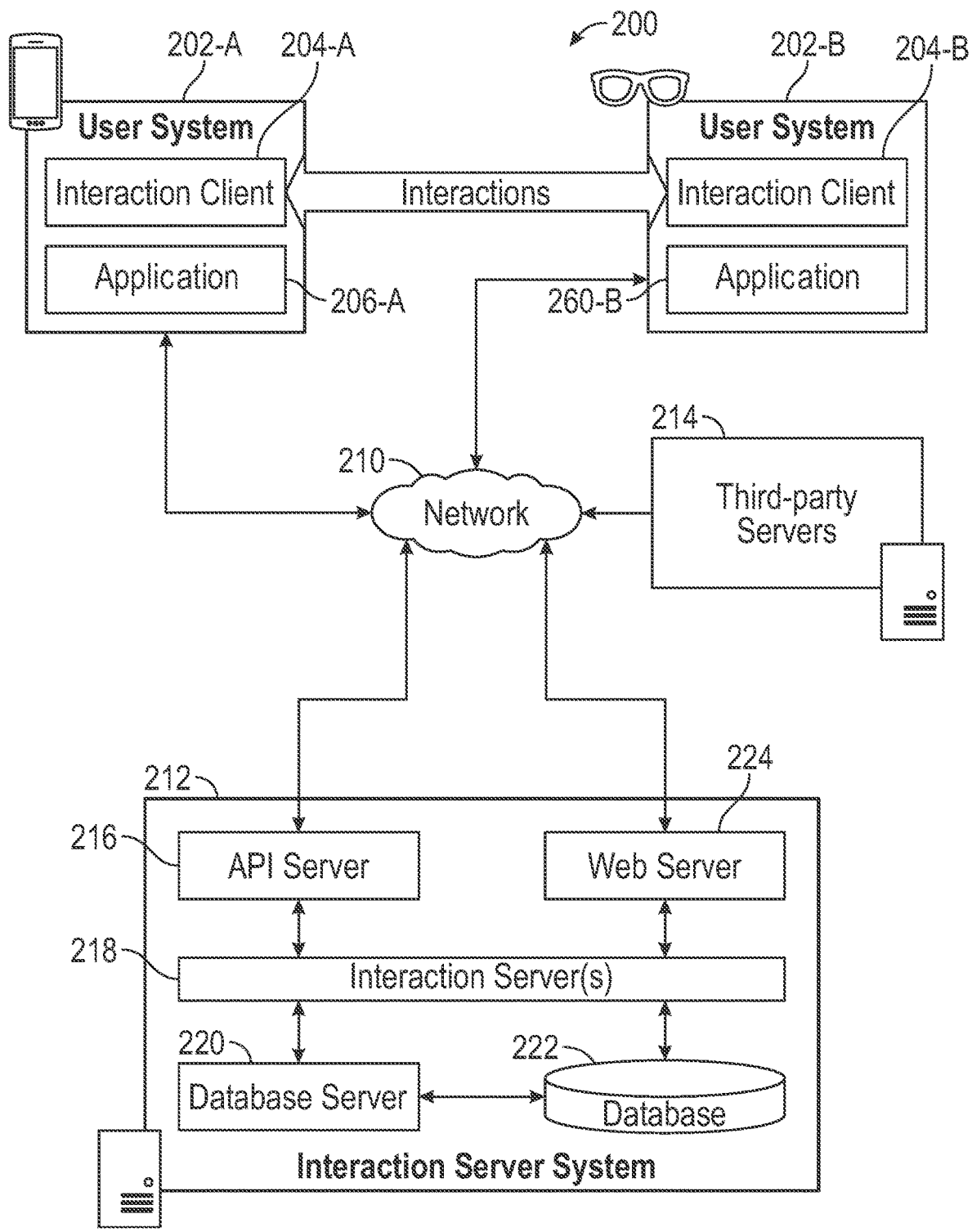
FIG. 2 is diagram illustrating an example of a computer network environment having an interaction server system, with which an improved messaging system may be integrated, consistent with some examples.

FIG. 2 is a block diagram showing an example interaction system 200 for facilitating interactions (e.g., exchanging messages, conducting audio and video calls, creating and configuring avatars, or playing games) over a network. The interaction system 200 includes multiple user systems (e.g., user systems 202-A and 202-B), each of which hosts multiple applications, including an interaction client 204-A and 204-B, and other applications 206-A and 206-B. Each interaction client is communicatively coupled, via one or more communication networks (e.g., network 210, which may be or include the Internet), to other instances of an interaction client (e.g., hosted on respective other user systems), an interaction server system 212 and third-party servers 214). An interaction client 204-A can also communicate with locally hosted applications 206-A, for example, using one or more application programming interface (API) calls.

Each user system 202-A and 202-B may be one of several different supported device types. Here, a device type is a designation that may indicate not only a form factor of the device, but also the device capabilities. For instance, in FIG. 2, the user system 202-A is shown as a mobile computing device (e.g., a mobile phone, or similar digital assistant). The user system 202-B is shown to be an AR device-specifically, wearable AR glasses. Of course, other device types, to include AR headsets, Virtual Reality headsets, laptop and desktop computing devices, may also be supported by the interaction server system 212. The interaction client 204-A and the related applications 206-A that are installed on each device are generally developed and built to be device specific, such that each interaction client is configured to support the device type on which it is installed and executing. Accordingly, the versions of the interaction client 204-A and applications 206-A installed and executing on a mobile computing device, such as user system 202-A, will differ to some extent from the versions of interaction client 204-B and applications 206-B installed and executing on an AR device, such as the user system 202-B.

Each interaction client 204-A interacts with other interaction clients 204-B and with the interaction server system 212 via the network 210. The data exchanged between the interaction clients (e.g., interactions 124) and between the interaction clients and the interaction server system 212 includes functions (e.g., commands to invoke functions) and payload data (e.g., text, audio, video, or other multimedia data).

The interaction server system 212 provides server-side functionality via the network 210 to the interaction clients 204-A and 204-B. While certain functions of the interaction system 100 are described herein as being performed by either an interaction client 204-A and 204-B or by the interaction server system 212, the location of certain functionality either within the interaction client 204-A and 204-B or the interaction server system 212 may be a design choice. For example, it may be technically preferable to initially deploy particular technology and functionality within the interaction server system 210 but to later migrate this technology and functionality to the interaction client 204-A and 204-B where a user system 202-A and 202-B has sufficient processing capacity. By way of example, a messaging application executing on an AR device may process an audio recording captured with an audio input (e.g., a microphone) to convert the audio recording to a text-based message, for example, using a speech-to-text algorithm executed at the AR device. However, as some AR devices may have limited power and/or processing capabilities, in some examples, an audio recording captured via an AR device may be communicated over the network 210 to a server, where the captured audio is translated to text by a speech-to-text translation service executing server-side. The resulting text-based message may then be forwarded to one or more intended message recipients.

The interaction server system 212 supports various services and operations that are provided to the interaction clients. Such operations include transmitting data to, receiving data from, and processing data generated by the interaction clients. This data may include message content, client device information, geolocation information, media augmentation and overlays, avatar animation files, message content persistence conditions, entity relationship information, and live event information. Data exchanges within the interaction system 200 are invoked and controlled through functions available via user interfaces (UIs) of the interaction clients 204-A and 204-B.

Turning now specifically to the interaction server system 212, an application programming interface (API) server 216 is coupled to and provides programmatic interfaces to interaction servers 218, making the functions of the interaction servers 218 accessible to interaction clients 204-A and 204-B, other applications 206-A and 206-B and third-party server 214. The interaction servers 218 are communicatively coupled to a database server 220, facilitating access to a database 222 that stores data associated with interactions processed by the interaction servers 218. Similarly, a web server 224 is coupled to the interaction servers 218 and provides web-based interfaces to the interaction servers 218. To this end, the web server 224 processes incoming network requests over the Hypertext Transfer Protocol (HTTP) and several other related protocols.

The API server 216 receives and transmits interaction data (e.g., commands and message payloads) between the interaction servers 218 and the user systems 202-A and 202-B (and, for example, interaction clients 204-A and 204-B, and other applications 206-A and 206-B) and the third-party server 214. Specifically, the API server 216 provides a set of interfaces (e.g., addressable API endpoints) for invoking commands, functions, routines, and to access data sources. Each API call will invoke functionality provided by the interaction servers 218. The API server 216 exposes various functions supported by the interaction servers 218, including account registration; login functionality; the sending of interaction data, via the interaction servers 218, from a particular interaction client 204-A to another interaction client 204-B; the communication of media files (e.g., images or video) from an interaction client 204-A to the interaction servers 218; the settings of a collection of media data (e.g., a story); the retrieval of a list of friends of an end-user of a user system 202-A or 202-B; the retrieval of messages and content; the addition and deletion of entities (e.g., friends) to an entity relationship graph 320; the location of friends within an entity relationship graph; and opening an application event (e.g., relating to the interaction client 204-A and 204-B).

The interaction servers 218 host multiple systems and subsystems, including an improved messaging system 312, described below with reference to FIG. 3 and FIG. 4.

System Architecture

Figure 3:
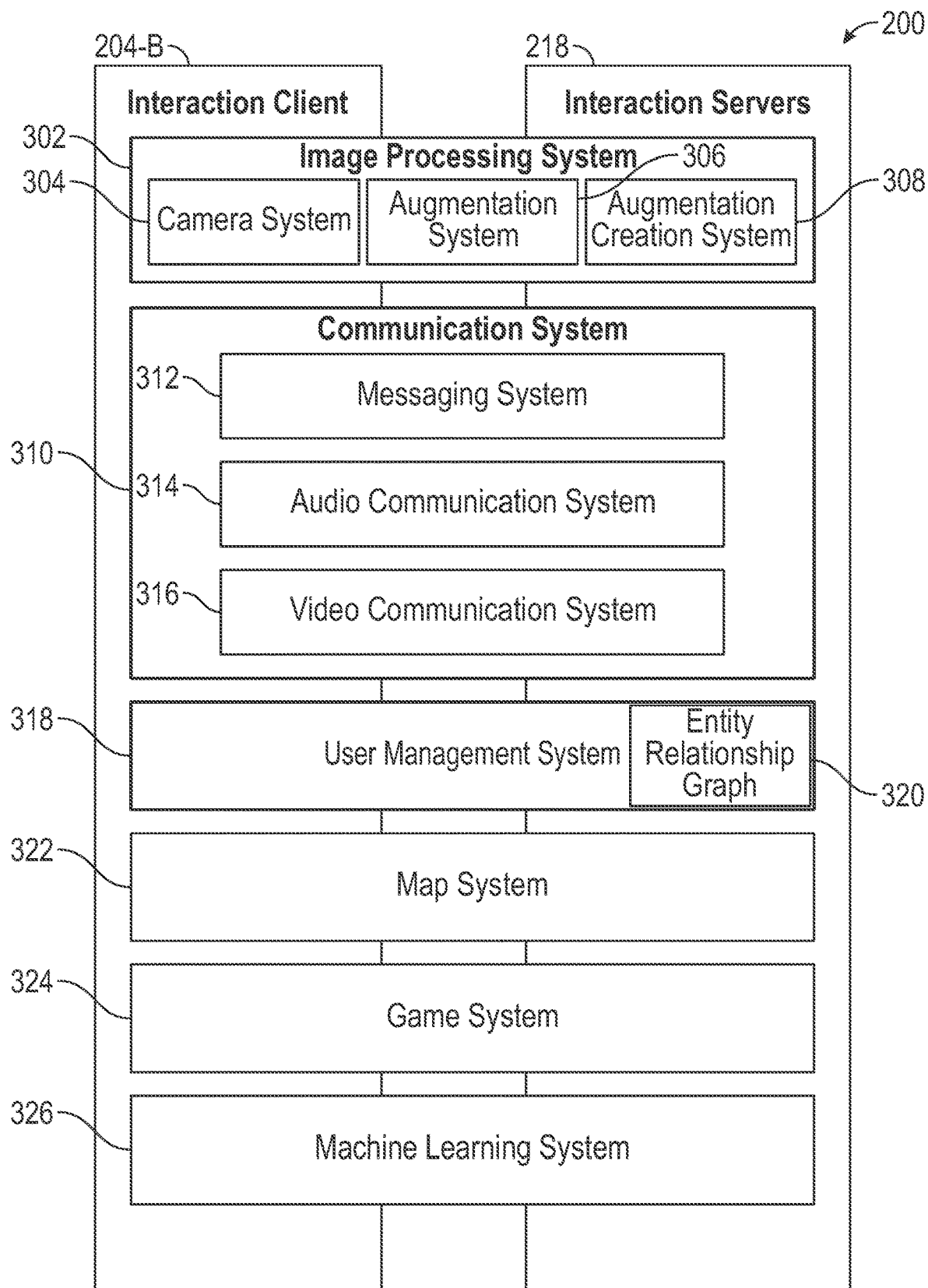
FIG. 3 is a diagram illustrating a further example of an interaction server system with which an improved messaging system is integrated, consistent with some examples.

FIG. 3 is a block diagram illustrating further details regarding the interaction system 200, according to some examples. Specifically, the interaction system 200 is shown to comprise the interaction client 204-B and the interaction servers 218. The interaction system 200 embodies multiple subsystems, which are supported on the client-side by the interaction client 204-B and on the server-side by the interaction servers 218. In some examples, these subsystems are implemented as microservices. A microservice subsystem (e.g., a microservice application) may have components that enable it to operate independently and communicate with other services. Example components of microservice subsystem may include:

Function logic: The function logic implements the functionality of the microservice subsystem, representing a specific capability or function that the microservice provides.

API interface: Microservices may communicate with other components through well-defined APIs or interfaces, using lightweight protocols such as REST or messaging. The API interface defines the inputs and outputs of the microservice subsystem and how it interacts with other microservice subsystems of the interaction system 200.

Data storage: A microservice subsystem may be responsible for its own data storage, which may be in the form of a database, cache, or other storage mechanism (e.g., using the database server 220 and database 222). This enables a microservice subsystem to operate independently of other microservices of the interaction system 200.

Service discovery: Microservice subsystems may find and communicate with other microservice subsystems of the interaction system 200. Service discovery mechanisms enable microservice subsystems to locate and communicate with other microservice subsystems in a scalable and efficient way.

Monitoring and logging: Microservice subsystems may need to be monitored and logged in order to ensure availability and performance. Monitoring and logging mechanisms enable the tracking of health and performance of a microservice subsystem.

In some examples, the interaction system 200 may employ a monolithic architecture, a service-oriented architecture (SOA), a function-as-a-service (FaaS) architecture, or a modular architecture:

An image processing system 302 provides various functions that enable an end-user to capture and augment (e.g., annotate or otherwise modify or edit) media content associated with a message. A camera system 304 includes control software (e.g., in a camera application) that interacts with and controls camera hardware (e.g., directly or via operating system controls) of the user system 202-B to modify and augment real-time images captured and displayed via the interaction client 204-B.

The augmentation system 306 provides functions related to the generation and publishing of augmentations (e.g., media overlays) for images captured in real-time by cameras of the user system 202-B or retrieved from memory of the user system 202-B. For example, the augmentation system 306 operatively selects, presents, and displays media overlays (e.g., an image filter or an image lens) to the interaction client 204-B for the augmentation of real-time images received via the camera system 304 or stored images retrieved from memory of a user system 202-4. These augmentations are selected by the augmentation system 306 and presented to an end-user of an interaction client 204-B, based on a number of inputs and data, such as for example:

Geolocation of the user system 202-B;

Entity relationship information of the end-user of the user system 202-B; and

Virtual objects, including 3-D avatars, that have been anchored or pinned to an AR space, in the context of a user system 202-B that is an AR device.

An augmentation may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo or video) at user system 202-B for communication in a message, or applied to video content, such as a video content stream or feed transmitted from an interaction client 204-B. As such, the image processing system 302 may interact with, and support, the various subsystems of the communication system 310, such as the messaging system 312, the audio communication system 314, and the video communication system 316.

Consistent with some examples, the augmentation system 306 may operate in connection with the camera system 304 to provide AR tracking capabilities, and for presenting virtual objects in AR space. Accordingly, images captured via the camera system 304 may be analyzed to derive a digital model or digital representation of a real-world environment. The augmentation system 306 can then utilize the digital representation of the real-world environment to anchor or pin virtual objects in AR space, and perform various AR techniques, such as relocalization, where an AR device analyzes a real-world environment to determine whether an existing AR space has been previously generated to correspond with the real-world environment.

A media overlay may include text or image data that can be overlaid on top of a photograph taken by the user system 202-A or 202-B or a video stream produced by the user system 202-A or 202-B. In some examples, the media overlay may be a location overlay (e.g., Venice beach), a name of a live event, or a name of a merchant overlay (e.g., Beach Coffee House). In further examples, the image processing system 302 uses the geolocation of the user system 202-B to identify a media overlay that includes the name of a merchant at the geolocation of the user system 202-B. The media overlay may include other indicia associated with the merchant. The media overlays may be stored in the databases 222 and accessed through the database server 220.

The image processing system 302 provides a user-based publication platform that enables end-users to select a geolocation on a map and upload content associated with the selected geolocation. The end-user may also specify circumstances under which a particular media overlay should be offered to other end-users. The image processing system 302 generates a media overlay that includes the uploaded content and associates the uploaded content with the selected geolocation.

The augmentation creation system 308 supports augmented reality developer platforms and includes an application for content creators (e.g., artists and developers) to create and publish augmentations (e.g., augmented reality experiences) of the interaction client 204-B. The augmentation creation system 308 provides a library of built-in features and tools to content creators including, for example custom shaders, tracking technology, and templates.

In some examples, the augmentation creation system 308 provides a merchant-based publication platform that enables merchants to select a particular augmentation associated with a geolocation via a bidding process. For example, the augmentation creation system 308 associates a media overlay of the highest bidding merchant with a corresponding geolocation for a predefined amount of time.

A communication system 310 is responsible for enabling and processing multiple forms of communication and interaction within the interaction system 200 and includes a messaging system 312, an audio communication system 314, and a video communication system 316. The messaging system 312 is responsible for enforcing the temporary or time-limited access to content by the interaction clients 204-A and 204-B. The messaging system 312 incorporates multiple timers (e.g., within an ephemeral timer system) that, based on duration and display parameters associated with a message or collection of messages (e.g., a story), selectively enable access (e.g., for presentation and display) to messages and associated content via the interaction client 204-B. The audio communication system 314 enables and supports audio communications (e.g., real-time audio chat) between multiple interaction clients. Similarly, the video communication system 316 enables and supports video communications (e.g., real-time video chat) between multiple interaction clients.

A user management system 318 is operationally responsible for the management of user data and profiles, and maintains entity information (e.g., stored in entity tables 506, entity relationship graphs 508 and profile data 516) regarding end-users and relationships between end-users of the interaction system 200.

A map system 322 provides various geographic location (e.g., geolocation) functions and supports the presentation of map-based media content and messages by the interaction client 204-A and 204-B. For example, the map system 322 enables the display of end-user icons or avatars (e.g., stored in profile data 516) on a map to indicate a current or past location of "friends" of an end-user, as well as media content (e.g., collections of messages including photographs and videos) generated by such friends, within the context of a map. For example, a message posted by an end-user to the interaction system 200 from a specific geographic location may be displayed within the context of a map at that particular location to "friends" of a specific end-user on a map interface of the interaction client 204-A and 204-B. An end-user can furthermore share his or her location and status information (e.g., using an appropriate status avatar) with other end-users of the interaction system 200 via the interaction client 204-A and 204-B, with this location and status information being similarly displayed within the context of a map interface of the interaction client 204-A and 204-B to selected end-users.

A game system 324 provides various gaming functions within the context of the interaction client 204-A and 204-B. The interaction client 204-A and 204-B provides a game interface providing a list of available games that can be launched by an end-user within the context of the interaction client and played with other end-users of the interaction system 200. The interaction system 200 further enables a particular end-user to invite other end-users to participate in the play of a specific game by issuing invitations to such other end-users from the interaction client 204-A and 204-B. The interaction client 204-A and 204-B also supports audio, video, and text messaging (e.g., chats) within the context of gameplay, provides a leaderboard for the games, and also supports the provision of in-game rewards (e.g., coins and items).

An artificial intelligence and machine learning system 326 provides a variety of services to different subsystems within the interaction system 200. For example, the artificial intelligence and machine learning system 326 operates with the image processing system 302 and the camera system 304 to analyze images and extract information such as objects, text, or faces. This information can then be used by the image processing system 302 to enhance, filter, or manipulate images. The artificial intelligence and machine learning system 326 may be used by the augmentation system 306 to generate augmented content and augmented reality experiences, such as adding virtual objects or animations to real-world images. The communication system 310 and messaging system 312 may use the artificial intelligence and machine learning system 326 to analyze communication patterns and provide insights into how end-users interact with each other and provide intelligent message classification and tagging, such as categorizing messages based on sentiment or topic. The artificial intelligence and machine learning system 326 may also provide chatbot functionality to message interactions between user systems 202A and 202-B, and between user system 202-A and the interaction server system 212. The artificial intelligence and machine learning system 326 may also work with the audio communication system 314, and/or the messaging system 312 to provide speech recognition and natural language processing capabilities-including speech-to-text, and text-to-speech capabilities-allowing end-users to interact with the interaction system 200 using audio (e.g., spoken) commands.

Messaging System

Figure 4:
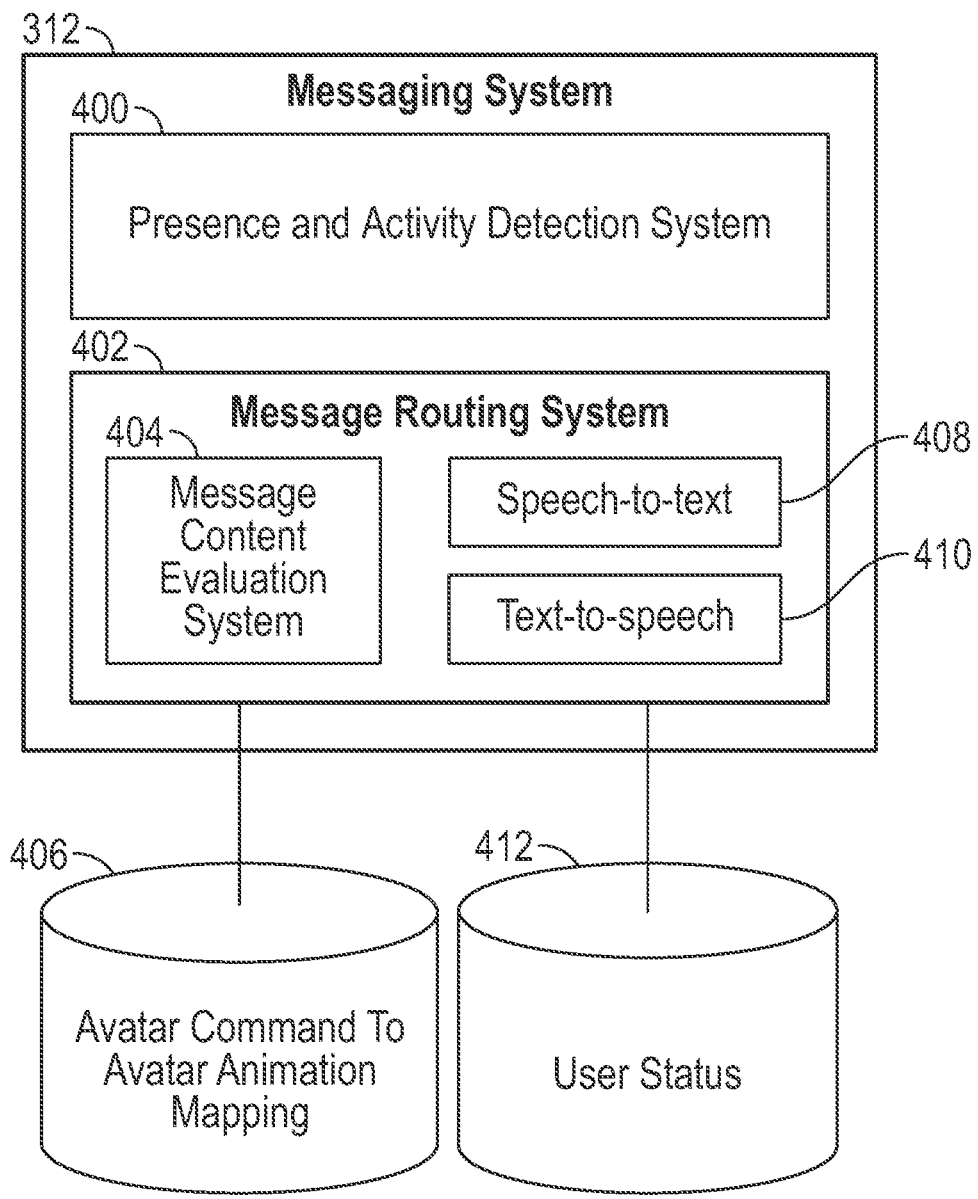
FIG. 4 is a diagram illustrating an example of the functional components of an improved messaging system, consistent with some examples.

FIG. 4 is a diagram illustrating an example of the functional components of an improved messaging system 312, consistent with some examples. As shown in FIG. 4, the messaging system 312 includes a presence and activity detection system 400 and message routing system 402. The presence and activity detection system 400 receives status and activity data from client computing devices that are executing an instance of the interaction client 204-A and 204-B, and/or a messaging application. In one example, a background process task executing as part of the messaging application actively monitors end-user activity at a client computing device, and then generates status and activity data that is communicated, wirelessly, over a network to the presence and activity detection system 400 of the messaging system 312. The status and activity data that is obtained at the client device, and communicated to the presence and activity detection system 400 may include data indicating any of the following:

General end-user status information (e.g., the end-user is (or is not) logged in to messaging service.)
Activity status (e.g., the end-user is actively using the messaging application, actively typing a message, or actively dictating or speaking an audible message.)
Device Type (e.g., mobile phone, laptop or desktop computer, AR device.)
AR space status (e.g., the end-user is actively using an AR device and located in a real-world environment associated with an AR space in which an avatar has been anchored or pinned.)

Consistent with some examples, the presence and activity detection system 400, upon receiving status and activity data from a client device, will update a status record for the corresponding end-user in a user status table of a database 412. Additionally, the presence and activity detection system 400 may generate instructions, and communicate those instructions to other client devices, causing a messaging application executing at a client device to update a user interface to reflect a current status of another end-user. This is particularly advantageous when the end-user status information for a first end-user, as conveyed to a second end-user, reflects the type of client device that is being used by the first end-user. For instance, consistent with some examples, the messaging application may indicate to an end-user the specific type of device that another end-user is actively using. Moreover, in some examples, the status information conveyed to an end-user may include information indicating whether another end-user is currently viewing an AR space in which an avatar of the first end-user is anchored or pinned. Accordingly, when an end-user is preparing a text-based message, the end-user who is sending the message will be able to tailor his or her message for the type of client device being used by the message recipient. In the case of an AR device, this means that a message sender may be able to include in a message a specific instruction or command that will cause an avatar corresponding with the message sender to perform a specific avatar animation. For example, if a first end-user understands that a second end-user is currently using an AR device in a real-world environment or location associated with an AR space in which the second end-user has anchored or pinned an avatar representing the first end-user, then the first end-user can send a message to the second end-user that will cause the avatar to perform a specific avatar animation—such, as waving to the second end-user.

As illustrated in FIG. 4, the messaging system 312 includes a message routing system 402. In general, when a text-based message is received, that message is made available to any intended message recipients. However, as shown in FIG. 4, the message routing system 402 includes a message content evaluation system 404, which will analyze a received message and, in some instances, alter a message or determine if additional instructions should be communicated with a message. For example, when an intended recipient of a message is using an AR device, the message content evaluation system 404 will analyze the content of a text-based message to determine whether the message includes a message element that may be associated with an avatar animation. The message element may be an emoji, or a specific sequence of characters. In either case, upon detecting the presence in a message of a specific message element, the message content evaluation system 404 may identify a particular avatar animation that is associated with the message element. The message content evaluation system may then generate meta-data or additional instructions that are communicated to the client device of the message recipient, such that the client device can process the received meta-data or instructions, and in some instance, cause an avatar to perform an avatar animation.

As shown in FIG. 4, the avatar command to avatar animation mapping is a table that maps specific message elements to specific avatar animations. By way of example, a set of emoji may have corresponding avatar animations, such that, when a message including an emoji is received at a messaging application executing at an AR device, the messaging application will process the received emoji by causing an avatar to perform some animation consistent with the received emoji.

Consistent with some examples, the message content evaluation system 404 and the avatar command to avatar animation mapping 406 may be located at each client computing device, as opposed to at the server executing the messaging system or service. Accordingly, at least with some examples, the messaging application executing at an AR device will analyze a received message for the purpose of determining whether the message includes any message element that is to be handled as a special command for causing an avatar to perform an avatar animation.

As shown in FIG. 4, the message routing system 402 includes components for speech-to-text 408 and text-to-speech 410. In some examples, when a text-based message is received by the message routing system 402, the messaging routing system 402 may determine that an intended recipient is using an AR device. The text of the received message may be converted by the text-to-speech component 410 to an audio file. Accordingly, the audio file is then communicated over a network to the messaging application executing at the AR device. When the audio file is received at the messaging application executing at the AR device, the message may be communicated to the intended recipient (e.g., the end-user of the AR device) by playing back the audio file. In some instances, the avatar may be animated to perform lip-syncing, with the playback of the audio file. That is, the mouth and lips of the avatar may be manipulated to convey to the end-user that the avatar is speaking the message that is played via playback of the audio file. When a message is communicated to a messaging application as an audio file, the original text-based message may or may not also be communicated. For example, in some scenarios this may be a setting that is configurable by each end-user.

The message routing system 402 of the messaging system 312 illustrated in FIG. 4 additionally includes speech-to-text component 408. Accordingly, consistent with some examples, when an end-user of a messaging application executing at an AR device records an audio file with a spoken message, the audio file may be processed at the AR-device and translated to a text-based message. However, in some examples, the audio recording may be communicated to the message routing system 402, at which the speech-to-text component 408 will analyze and convert the audio to a text-based message. The text-based message may then be communicated to an end-user using a conventional client computing device.

Consistent with some examples, the messaging system 312 supports four specific types or methods of messaging. These methods include direct text, where the message is a text-based message. A second messaging method involves text-to-speech messaging, where text entered by one end-user is converted to an audio message for playback by another end-user. A third messaging method involves speech-to-text, where one end-user speaks an audio message, and that message is converted to text for presentation to another end-user. Finally, a fourth messaging method involves direct speech, which may be synchronous, or asynchronous. For example, two end-users may have a voice conversation live, or one end-user may record an audio message that is received by another end-user, but played back at a later time.

Data Architecture

Figure 5:
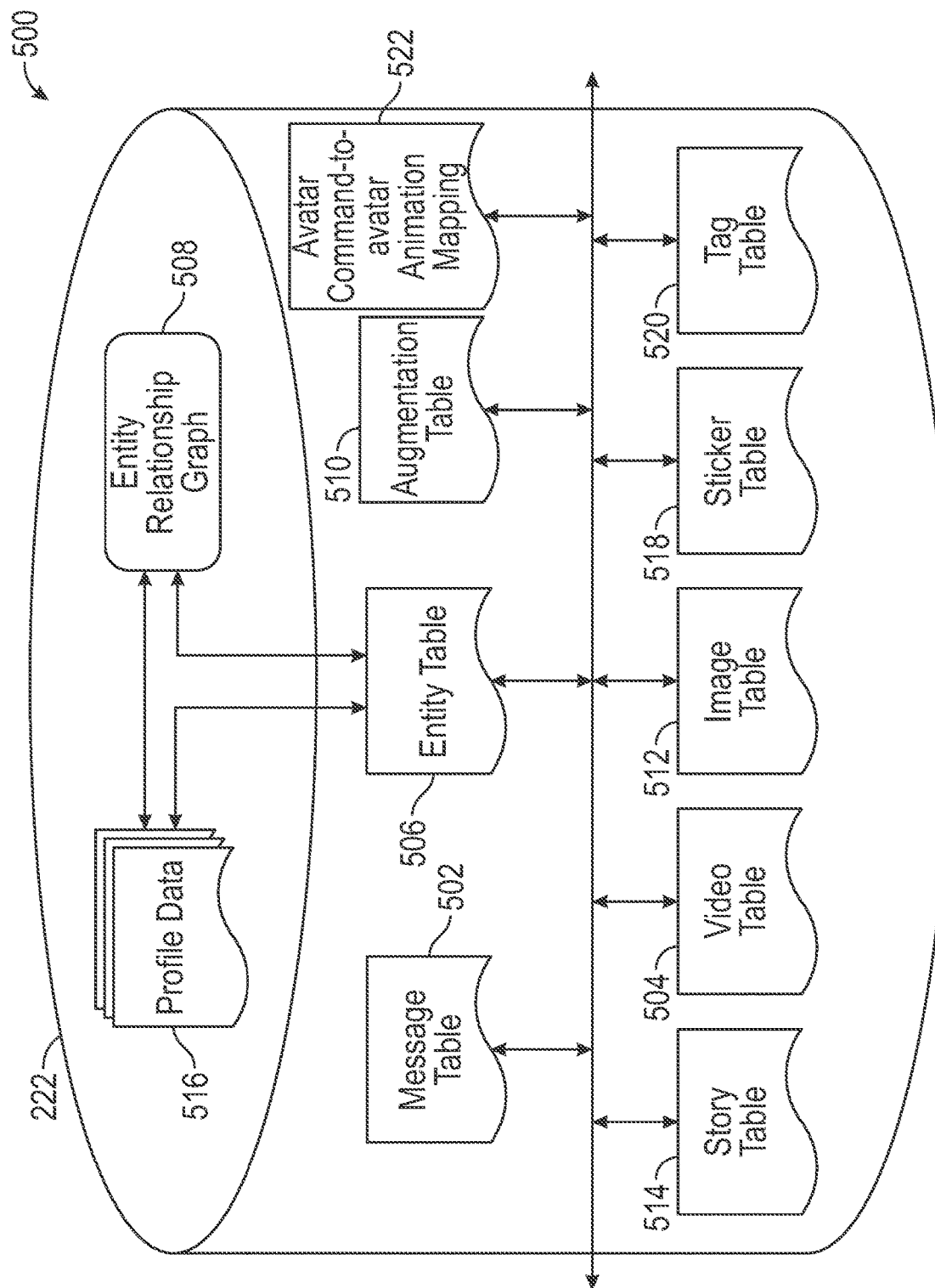
FIG. 5 is a diagram illustrating an example data structure, for use with an improved messaging system, according to some examples.

FIG. 5 is a schematic diagram illustrating data structures 500, which may be stored in the database 222 of the interaction server system 200, according to certain examples. While the content of the database 222 is shown to comprise multiple tables, it will be appreciated that the data could be stored in other types of data structures (e.g., as an object-oriented database, a graph database, or others).

The database 500 includes message data stored within a message table 502. This message data includes, for any particular message, at least message sender data, message recipient (or receiver) data, and a payload. Further details regarding information that may be included in a message and included within the message data stored in the message table 502, are described below with reference to FIG. 6.

An entity table 506 stores entity data, and is linked (e.g., referentially) to an entity relationship graph 508 and profile data 516. Entities for which records are maintained within the entity table 506 may include individuals, corporate entities, organizations, objects, places, events, and so forth. Regardless of entity type, any entity regarding which the interaction server system 212 stores data may be a recognized entity. Each entity is provided with a unique identifier, as well as an entity type identifier (not shown).

The entity relationship graph 508 stores information regarding relationships and associations between entities. Such relationships may be social, professional (e.g., work at a common corporation or organization), interest-based, or activity-based, merely for example. Certain relationships between entities may be unidirectional, such as a subscription by an individual end-user to digital content of a commercial or publishing end-user (e.g., a newspaper or other digital media outlet, or a brand). Other relationships may be bidirectional, such as a "friend" relationship between individual end-users of the interaction system 200.

Certain permissions and relationships may be attached to each relationship, and also to each direction of a relationship. For example, a bidirectional relationship (e.g., a friend relationship between individual end-users) may include authorization for the publication of digital content items between the individual end-users but may impose certain restrictions or filters on the publication of such digital content items (e.g., based on content characteristics, location data or time of day data). Similarly, a subscription relationship between an individual end-user and a commercial end-user may impose different degrees of restrictions on the publication of digital content from the commercial end-user to the individual end-user and may significantly restrict or block the publication of digital content from the individual end-user to the commercial end-user. A particular end-user, as an example of an entity, may record certain restrictions (e.g., by way of privacy settings) in a record for that entity within the entity table 506. Such privacy settings may be applied to all types of relationships within the context of the interaction system 200 or may selectively be applied to certain types of relationships.

The profile data 516 stores multiple types of profile data about a particular entity. The profile data 516 may be selectively used and presented to other end-users of the interaction system 200 based on privacy settings specified by a particular entity. Where the entity is an individual, the profile data 516 includes, for example, a username, telephone number, address, settings (e.g., notification and privacy settings), as well as a user-selected or user-configured avatar representation (or collection of such avatar representations), including a 3-D avatar for use in AR contexts. A particular end-user may then selectively include one or more of these avatar representations within the content of messages communicated via the interaction system 200, and on map interfaces displayed by interaction clients 204-A and 204-B to other end-users. The collection of avatar representations may include "status avatars," which present a graphical representation of a status or activity that the end-user may select to communicate at a particular time.

Where the entity is a group, the profile data 516 for the group may similarly include one or more avatar representations associated with the group, in addition to the group name, members, and various settings (e.g., notifications) for the relevant group.

The database 222 also stores augmentation data, such as overlays or filters, in an augmentation table 510. The augmentation data is associated with and applied to videos (for which data is stored in a video table 504) and images (for which data is stored in an image table 512).

Filters, in some examples, are overlays that are displayed as overlaid on an image or video during presentation to a recipient end-user. Filters may be of various types, including user-selected filters from a set of filters presented to a sending end-user by the interaction client 204-A and 204-B when the sending end-user is composing a message. Other types of filters include geolocation filters (also known as geo-filters), which may be presented to a sending end-user based on geographic location. For example, geolocation filters specific to a neighborhood or special location may be presented within a user interface by the interaction client, based on geolocation information determined by a Global Positioning System (GPS) unit of the user system.

Other augmentation data that may be stored within the image table 512 includes augmented reality content items (e.g., corresponding to applying "lenses" or augmented reality experiences). An augmented reality content item may be a real-time special effect and sound that may be added to an image or a video.

As mentioned above, the video table 504 stores video data that, in some examples, is associated with messages for which records are maintained within the message table 502. Similarly, the image table 512 stores image data associated with messages for which message data is stored in the entity table 506. The entity table 506 may associate various augmentations from the augmentation table 510 with various images and videos stored in the image table 512 and the video table 504.

As mentioned in the description of FIG. 4, in some examples, the message routing system 402 may include a message content evaluation system 404 that analyzes the content of messages in transit, for purposes of determining whether a message intended for a recipient using an AR device includes any special message element that might map to an avatar animation. Accordingly, as shown in FIG. 5, consistent with some examples, an avatar command-to-avatar mapping table 522 is included in a database 22. Consistent with some examples, the message content evaluation occurs at the server. However, in other cases, the avatar command-to-avatar mapping table 522 may be maintained at the server, but a copy is distributed to each client computing device, so that the logic for generating and interpreting messages associated with avatar animations can occur at the client device.

Data Communications Architecture

Figure 6:
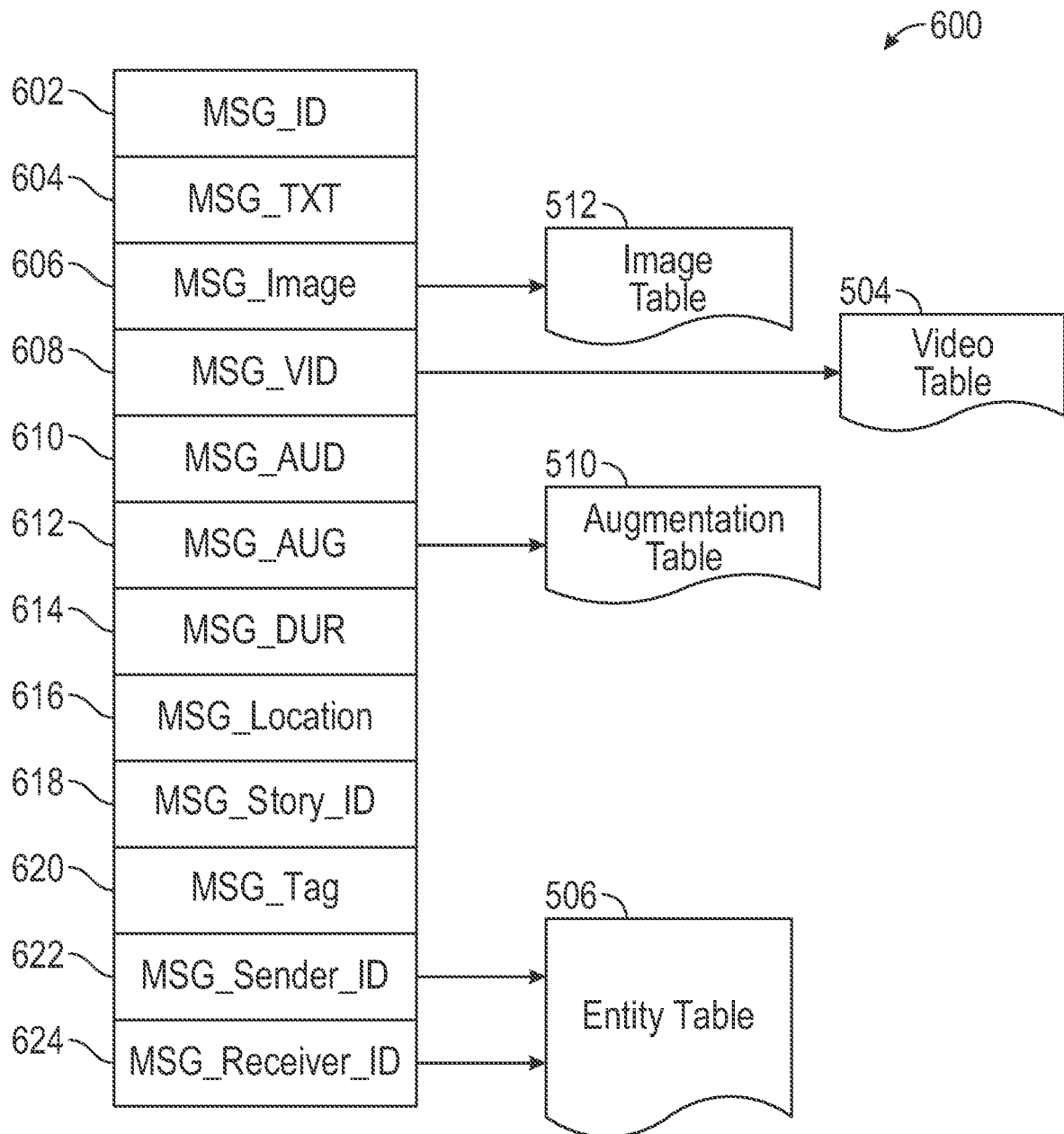
FIG. 6 is a diagram illustrating component parts of a message, consistent with some examples.

FIG. 6 is a schematic diagram illustrating a structure of a message 600, according to some examples, generated by an interaction client 204-A for communication to a further interaction client 204-B via the interaction servers 218. The content of a particular message 600 is used to populate the message table 502 stored within the database 222, accessible by the interaction servers 218. Similarly, the content of a message 600 is stored in memory as "in-transit" or "in-flight" data of the user system 202-A or 202-B or the interaction servers 218. A message 600 is shown to include the following example components:

Message identifier 602: a unique identifier that identifies the message 600.

Message text payload 604: text, to be generated by an end-user via a user interface of the user system, and that is included in the message 600.

Message image payload 606: image data, captured by a camera component of a user system or retrieved from a memory component of a user system, and that is included in the message 600. Image data for a sent or received message 600 may be stored in the image table 512.

Message video payload 608: video data, captured by a camera component or retrieved from a memory component of the user system, and that is included in the message 600. Video data for a sent or received message 600 may be stored in the image table 512.

Message audio payload 610: audio data, captured by a microphone or retrieved from a memory component of the user system, and that is included in the message 600.

Message augmentation data 612: augmentation data (e.g., filters, stickers, or other annotations or enhancements) that represents augmentations to be applied to message image payload 606, message video payload 608, or message audio payload 610 of the message 600. Augmentation data for a sent or received message 600 may be stored in the augmentation table 510.

Message duration parameter 614: parameter value indicating, in seconds, the amount of time for which content of the message (e.g., the message image payload 606, message video payload 608, message audio payload 610) is to be presented or made accessible to an end-user via the interaction client.

Message geolocation parameter 616: geolocation data (e.g., latitudinal, and longitudinal coordinates) associated with the content payload of the message. Multiple message geolocation parameter 616 values may be included in the payload, each of these parameter values being associated with respect to content items included in the content (e.g., a specific image within the message image payload 606, or a specific video in the message video payload 608).

Message story identifier 618: identifier values identifying one or more content collections (e.g., "stories" identified in a collections table) with which a particular content item in the message image payload 606 of the message 600 is associated. For example, multiple images within the message image payload 606 may each be associated with multiple content collections using identifier values.

Message tag 620: each message 600 may be tagged with multiple tags, each of which is indicative of the subject matter of content included in the message payload. For example, where a particular image included in the message image payload 606 depicts an animal (e.g., a lion), a tag value may be included within the message tag 620 that is indicative of the relevant animal. Tag values may be generated manually, based on user input, or may be automatically generated using, for example, image recognition.

Message sender identifier 622: an identifier (e.g., a messaging system identifier, email address, or device identifier) indicative of an end-user of the user system on which the message 600 was generated and from which the message 600 was sent.

Message receiver identifier 624: an identifier (e.g., a messaging system identifier, email address, or device identifier) indicative of an end-user of the user system to which the message 600 is addressed.

The contents (e.g., values) of the various components of message 600 may be pointers to locations in tables within which content data values are stored. For example, an image value in the message image payload 606 may be a pointer to (or address of) a location within an image table 512. Similarly, values within the message video payload 608 may point to data stored within an image table 512, values stored within the message augmentation data 612 may point to data stored in an augmentation table 510, values stored within the message story identifier 618 may point to data stored in a collections table, and values stored within the message sender identifier 622 and the message receiver identifier 624 may point to user records stored within an entity table 506.

Messaging Between Different Device Types

Figure 7:
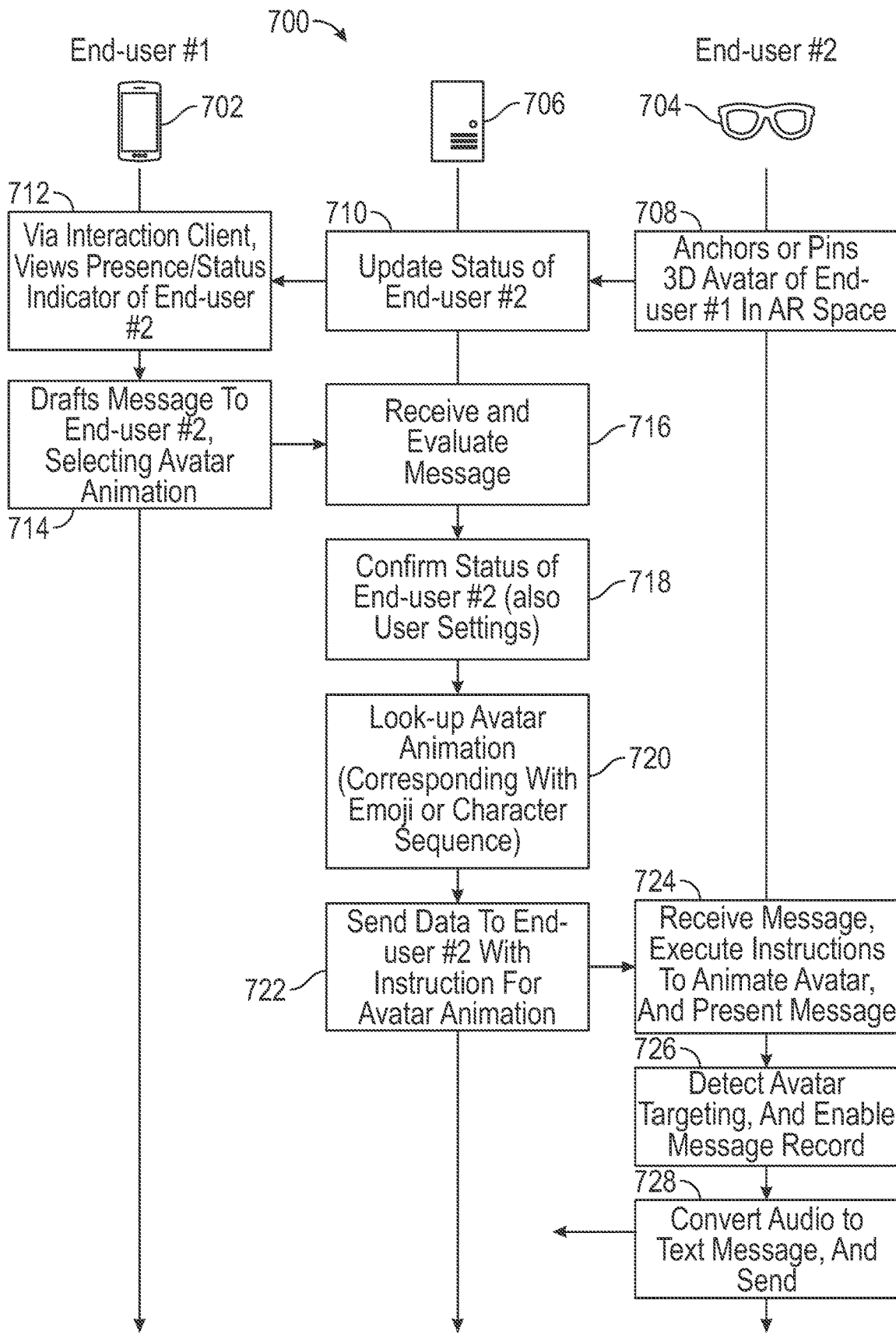
FIG. 7 is a data flow diagram illustrating various operations that occur during a messaging session between end-users who are using messaging applications executing on different types of computing devices, according to some examples.

FIG. 7 is a flow diagram illustrating various operations 700 that occur during a messaging session between two end-users who are using messaging applications executing on different types of computing devices 702 and 704, according to some examples. As illustrated in FIG. 7, the first end-user, with a client device 702, is using a messaging application executing on a conventional mobile client device 702 with a touchscreen display. The mobile device 702 may, for example, be a mobile phone. A second end-user, associated with the client device 704, is using a messaging application executing on an AR device 704. In this case, the AR device 704 is a pair of wearable AR glasses. The exchange of messages between the two devices 702 and 704 is facilitated by a messaging service or messaging system 706, with which each device connects and communicates wirelessly.

In this example, the text-based messaging session begins when the second end-user, wearing the AR device 704, performs an anchoring or pinning operation 708 to anchor or pin a 3-D avatar, representing the first end-user, to a position in a real-world environment. The anchoring operation 708 is further illustrated and described in connection with FIG. 8.

Figure 8:
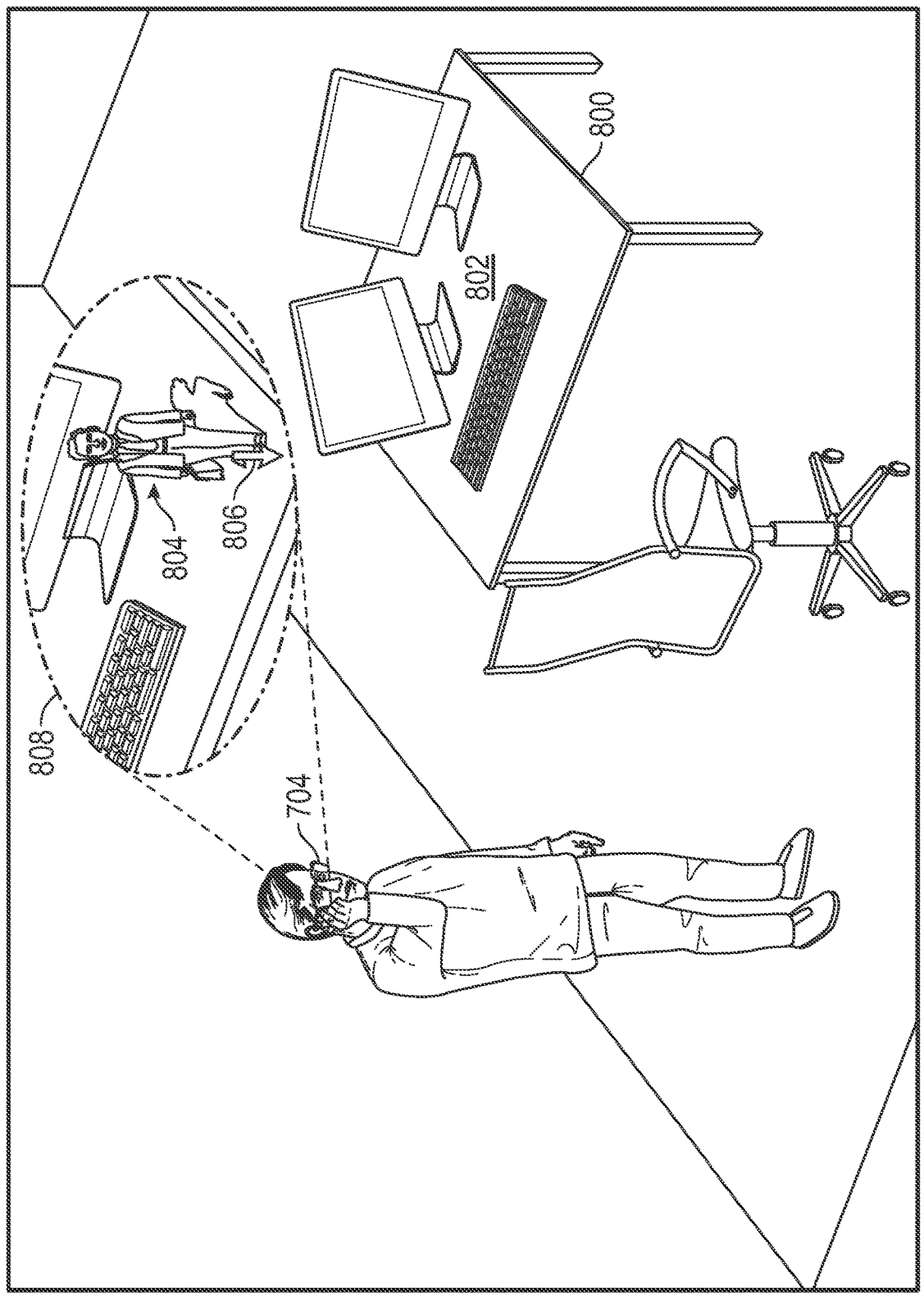
FIG. 8 is a diagram illustrating an example of an end-user, wearing an AR device, performing an operation to "anchor," or "pin" a 3-D avatar in AR space, consistent with some examples.

As shown in FIG. 8, the second end-user, wearing the AR device 704, interacts with an interface of the interaction client 204-B or the messaging application executing on the device 704 to access a 3-D avatar of the first end-user. When the display device of the AR device 704 is presenting the 3-D avatar 804, the second end-user moves his or her head to look in the direction of a specific location or physical object in a position in AR space at which the second end-user desires to anchor or pin the 3-D avatar. In one example, the second end-user may hold a button down on the AR device 704, while moving his or her head, thus signaling to the AR device 704 that the end-user is attempting to anchor or pin the 3-D avatar. As the end-user moves his or her head, the computer vision algorithms executing on the AR device receive and processes images from the surrounding real-world environment, as the AR device 704 attempts to identify surfaces (e.g., horizontal planes) suitable for anchoring or pinning virtual objects, including the 3-D avatar 804. One or more sensors (e.g., a camera or image capturing device) of the AR device 704 process images, for example, frame by frame, to identify flat and horizontal surfaces upon which the 3-D avatar might be anchored or pinned. As shown in FIG. 8, the end-user is looking to the right of the keyboard 802 atop the desk 800. When the AR device 704 identifies the flat surface of the desktop 800, the AR device 704 may provide visual feedback (e.g., the arrow with reference 806) to the end-user to indicate that the position in AR space corresponding with the desktop surface is a candidate location for anchoring or pinning the 3-D avatar. This visual feedback may be, for example, some type of graphic or marker displayed in the location of the identified surface. In one example, a shadow may be generated and cast on a detected flat surface to support the immersion of the real and digital worlds. Accordingly, when the end-user has the appropriate portion of the desktop surface 800 in his or her line of sight, and the visual cue or marker (e.g., arrow 806) is being presented, the end-user will release the button on the AR device 704, and the presentation of the 3-D avatar 804 via the display device of the AR device 704 will be updated to reflect that the 3-D avatar 804 has been anchored or pinned to the desktop 800. Once the avatar has been anchored or pinned, the end-user can move his or her head, and the AR device 704 will consistently track the environment to continuously update the AR view 806 so that the presentation of the 3-D avatar stays fixed in the specific position in AR space, and appears to be atop the desk 800.

In some examples, during the operation to anchor or pin a 3-D avatar, the user interface may provide cues—for instance, graphics or visual markers—to indicate, for example, that an avatar is currently in a position where the avatar can be anchored or pinned. Similarly, a visual cue or marker may be presented to indicate that the avatar has been successfully anchored or pinned. In addition, immediately subsequent to anchoring or pinning a 3-D avatar, the user interface may provide a means for scaling the size of the avatar up, or down, to a size that is suitable and desired, given the particulars of the environment and the specific object on which the avatar has been anchored.

Referring again to FIG. 7, once the second end-user, wearing the AR device 704, has anchored or pinned the 3-D avatar, representing the first end-user, to the desk, the messaging application executing on the AR device 704 communicates a status update 710 to the messaging system 706. Specifically, the status update 710 includes data that reflects that the second end-user is using an AR device 704, actively online via the messaging application, and currently located in a real-world environment that is associated with an AR space at which a 3-D avatar representing the first end-user has been anchored. Accordingly, the messaging system 706, upon updating the status of the second end-user (e.g., storing the status), will also generate an instruction for communicating to the mobile client device 702 of the first end-user. Specifically, the interaction client 204-A or the messaging application executing at the client device 702 will receive a status update relating to the status of the second end-user. As such, a user interface will be updated to reflect the status update associated with the second end-user. The status update may be presented in any number of different ways. In one example, a visual representation of the second end-user will be updated, for example, by depicting a digital representation of the second end-user wearing an AR device. In another example, a graphic or icon may have a specific color to reflect the online or offline status of the second end-user. In some instances, the visual representation of the status update may be presented in the context of a contact list, or a user interface of the messaging application. In one example, a location-based map service may display a map that includes some indication as to the current location of other end-users. Accordingly, in one example, the visual representation of the status update may be communicated as part of the location-based map service. For example, an avatar of the second end-user may be positioned on a map interface to reflect his or her location, as determined from data obtained via the AR device 704, and the visual representation of the second end-user (e.g., the avatar) may be enhanced to depict the avatar wearing an AR device. Importantly, in some examples, the visual representation of the status update relating to the status of the second end-user conveys specific information to the first end-user. For instance, the status update specifically conveys to the first end-user that his or her avatar is currently viewable by the second end-user. Accordingly, the status update may provide motivation for the first end-user to send a message to the second end-user, where the message is specifically tailored for viewing via the AR device 704.

Next, at the operation with reference 714, the first end-user, using the messaging application executing on the client device 702, prepares a text-based message for communicating to the second end-user who is wearing the AR device 704. In this case, because the first end-user understands that the second end-user is wearing an AR device 704 and viewing an avatar representing the first end-user, the first end-user may desire to send a text-based message that will cause his or her avatar, as viewed by the second end-user, to perform an avatar animation of some kind. Example user interfaces for preparing a text-based message are shown and described in connection with FIGS. 9 and 10.

Figure 9:
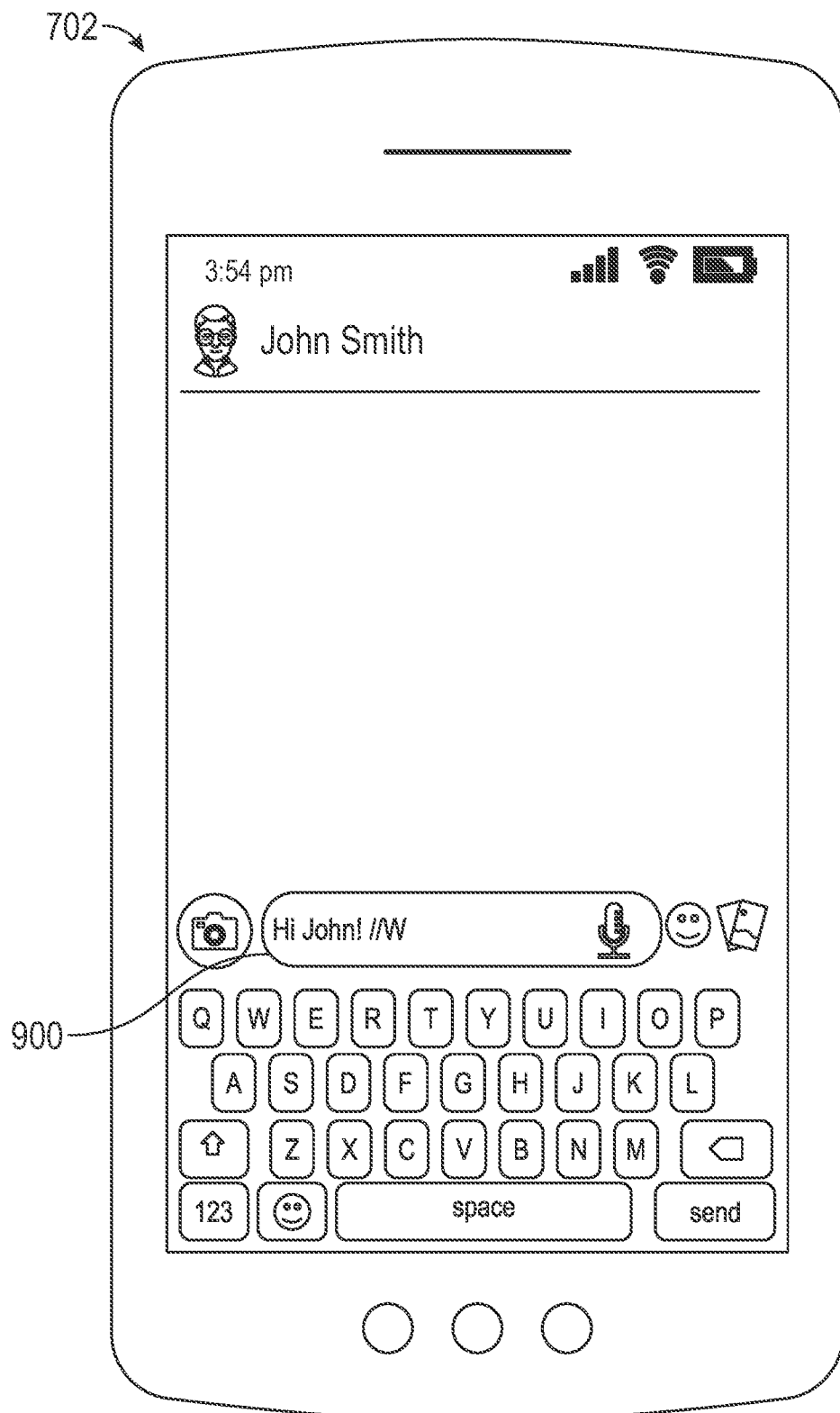
FIG. 9 is a user interface diagram illustrating an example of a user interface via which a first end-user may prepare a text-based message with a sequence of characters that map to an avatar animation, the message to be communicated to a second end-user wearing an AR device, according to some examples.

As illustrated in FIG. 9, the first end-user has prepared a text-based message 900. In this example, the text-based message 900 includes the following text, "Hi John! //W". In this example, the text, "//W" is to be interpreted by the messaging system 706 or the messaging application executing on the AR device 704, as a special command or instruction that maps to an avatar animation that, when presented at the AR device 704, will cause an animation of the avatar to be presented, such that the 3-D avatar representing the first end-user will wave to the viewing second end-user.

Figure 10:
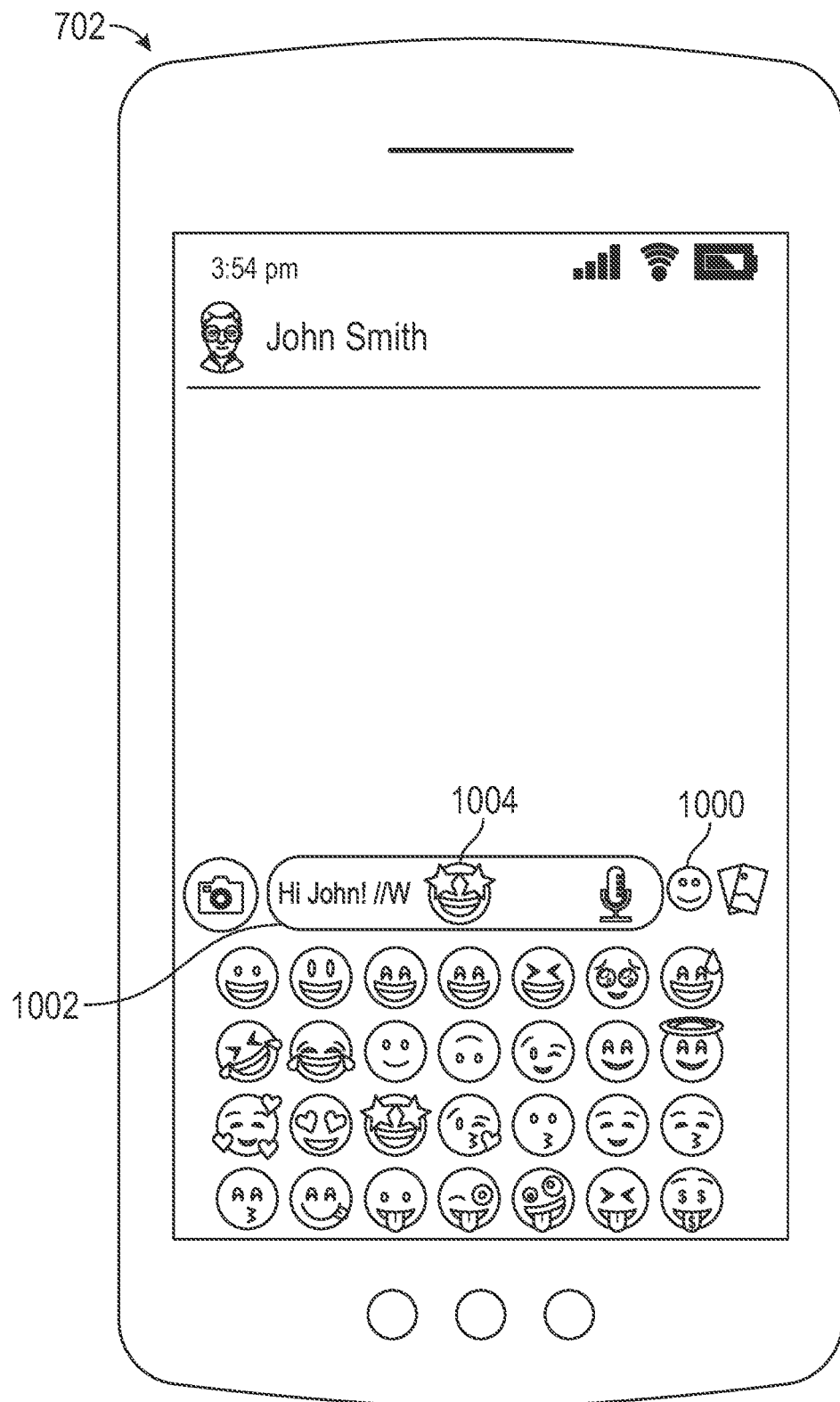
FIG. 10 is a user interface diagram illustrating an example of a user interface via which a first end-user may prepare a text-based message with an emoji that maps to an avatar animation, according to some examples.

In FIG. 10, another example of a user interface is presented. In this example, instead of using a designated combination of special characters to identify an avatar animation, an emoji is mapped to an avatar animation. Accordingly, as shown in FIG. 10, the first end-user has selected a user interface element 1000 (e.g., a symbol representing an emoji), causing the user interface to present a selection of selectable emoji. By selecting a specific emoji 1004, the selected emoji 1004 is inserted into the body of the text-based message in the text input element 1002.

Consistent with some examples, a user interface element may be presented, such that when it is selected, the end-user who is preparing the message is presented with a preview of the avatar performing the avatar animation corresponding with the emoji that has been selected, or the special sequence of characters that have been entered. In some examples, instead of a combination of special characters or an emoji, a separate set of custom graphics or icons may be presented in a user interface, where the selection of a graphic or icon will cause a preview of an avatar animation associated with the graphic or icon, and add, as meta-data, to the text-based message a command or instruction for presenting the avatar animation at the receiving AR device.

Figure 11:
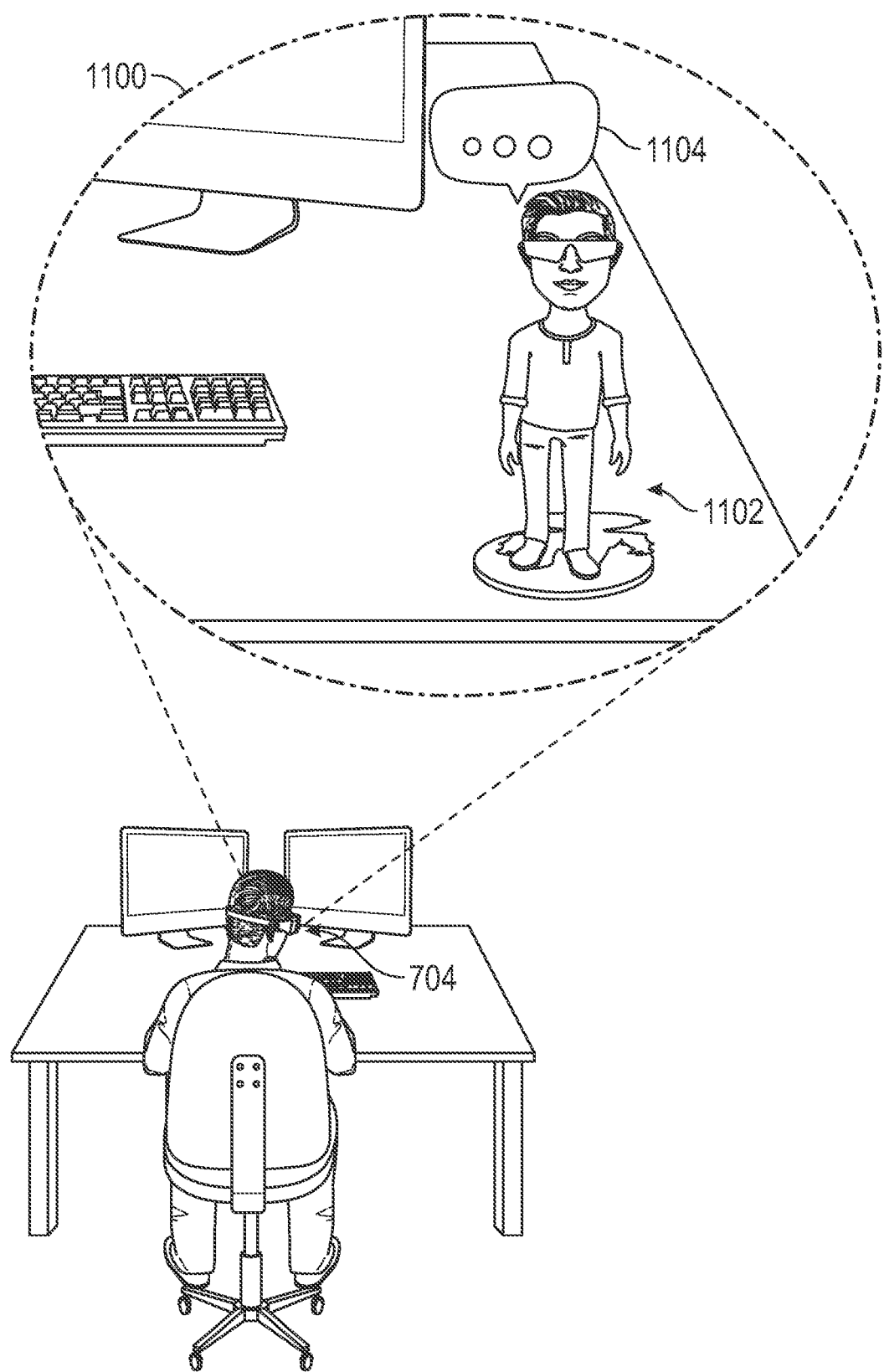
FIG. 11 is a diagram illustrating an example of an end-user wearing an AR device that is presenting to the end-user an AR view that includes an anchored 3-D avatar with a chat bubble that includes a series of dots to indicate that an end-user, represented by the avatar, is typing a message, consistent with some examples.

As illustrated in FIG. 11, when the first end-user is using the mobile device 702 to prepare a text-based message intended for the second end-user, wearing the AR device 704, activity data may be communicated from the mobile device 702 to the messaging system 706, and ultimately relayed to the AR device 704. In this example, the activity data indicates that the first end-user is preparing (e.g., typing) a text-based message. Accordingly, the messaging application executing at the AR device 704 will update the AR view 1100 to present a chat bubble 1104 proximate the 3-D avatar 1102. In this example, the chat bubble 1102 includes three dots (e.g., " . . . ") 1104 to indicate that the first end-user, who is represented by the avatar 1102, is typing a message directed to the second end-user, wearing the AR device 704. Of course, the visual representation of the activity indicator—in this case, the activity being typing—may be presented in any number of ways. In any case, the second end-user, wearing the AR device 704, is provided advanced notice of a possible incoming message from the first end-user, represented by the 3-D avatar 1102.

Referring again to FIG. 7, after the first end-user has prepared and sent the text-based message 714, at the operation with reference 716 the text-based message is received from the client device 702 at the messaging system 706, where, at least in some instances, the message will be analyzed and evaluated. For instance, in one example, as reflected by the operation with reference 718, when an incoming message is received, the messaging system 706 may check a status record associated with each intended message recipient to determine whether the intended message recipient is currently online with respect to the messaging system 706, and if online, the specific type of device that the end-user is using. In a scenario as presented in FIG. 7, when an intended recipient is in fact online and available via an AR device 704, the message system 706 will then evaluate the received text-based message to determine whether it includes a message element of any type that maps to an avatar animation, as shown with reference 720. If the text-based message includes a message element that maps to a particular avatar animation, the messaging system 706 will then prepare and send instructions to the messaging application executing at the AR device 704, instructing the messaging application to present the 3-D avatar performing the avatar animation.

At the AR device 704, it may be the case that when a message is received at the messaging application executing at the AR device 704, the end-user wearing the AR device 704 may not be looking in the direction of the 3-D avatar. That is, the 3-D avatar may not be in the field of view of the end-user. In this situation, if a message arrives from the end-user operating the mobile client device 702, the AR device 704 may need to play a sound or turn on an on-display visual as a notification or guide that a new message has arrived from end-user, represented by the 3-D avatar. The sound can be spatial audio, meaning that it can come from the specific direction of the 3-D avatar. The on-display visual could be an arrow, inviting the end-user to look in the specific direction of the 3-D avatar. Only when the end-user at the 3D avatar representing the end-user of the mobile client device 702, does the avatar animation start playing. This prevents the avatar animation from playing when the wearer of the AR device may not actually view the animation. Additionally, in some instances, this slight delay between receiving the message and playing the avatar animation may advantageously provide additional time for the messaging application executing at the AR device to retrieve the relevant media files, from local storage or from a remote server, for playing the avatar animation.

Consistent with some examples, each text-based message that includes a message element associated with an avatar animation is communicated over the network to the AR device 704 with payload data. For instance, the payload data (e.g., the media file(s) associated with the avatar animation) may be communicated to the AR device 704 with the text-based message. However, in other examples, the text-based message that is received at the messaging system 706 is simply relayed to the AR device 704, with no message content evaluation being performed at the server-based messaging system, and without including any payload data. Instead, when the text-based message is received at the AR device 704, the messaging application at the AR device 704 will analyze and evaluate the content of the message and determine whether a message element corresponds with an avatar animation. If there is a specific message element that corresponds with an avatar animation (e.g., an emoji, a special sequence of characters, or some other meta-data), the messaging application will access a client-side avatar command-to-avatar animation mapping, to identify the specific avatar animation and associated media files referenced by the message element received with the text-based message. If the appropriate media files are present (e.g., stored) at the AR device 704, the messaging application will simply execute a process to read and process the media files, thereby presenting the avatar animation. However, if the media files are not present at the AR device 704, then the messaging application may communicate a request to the messaging system, or an associated content distribution system, requesting the appropriate media files be sent to the messaging application at the AR device 704. Then, upon receiving the media files, the avatar animation is presented.

At the operation with reference 724, the AR device 704 receives the message and instructions to perform or play an avatar animation. In some examples, the avatar animation is presented while the text-based message is presented in a corresponding chat bubble proximate the 3-D avatar. In other examples, the media files that are associated with the avatar animation may include one or more audio files, and as such, the presentation of the avatar animation may include playback of an audio file—for example, the avatar may speak an audible message as part of the animation, or there may be sound effects to enhance the avatar animation. In some examples, the text of the text-based message is converted to an audio message using a text-to-speech algorithm, which is then presented before, after or during the presentation of the avatar animation. An example of presenting an avatar animation in an AR view is illustrated and described in connection with FIG. 12.

Figure 12:
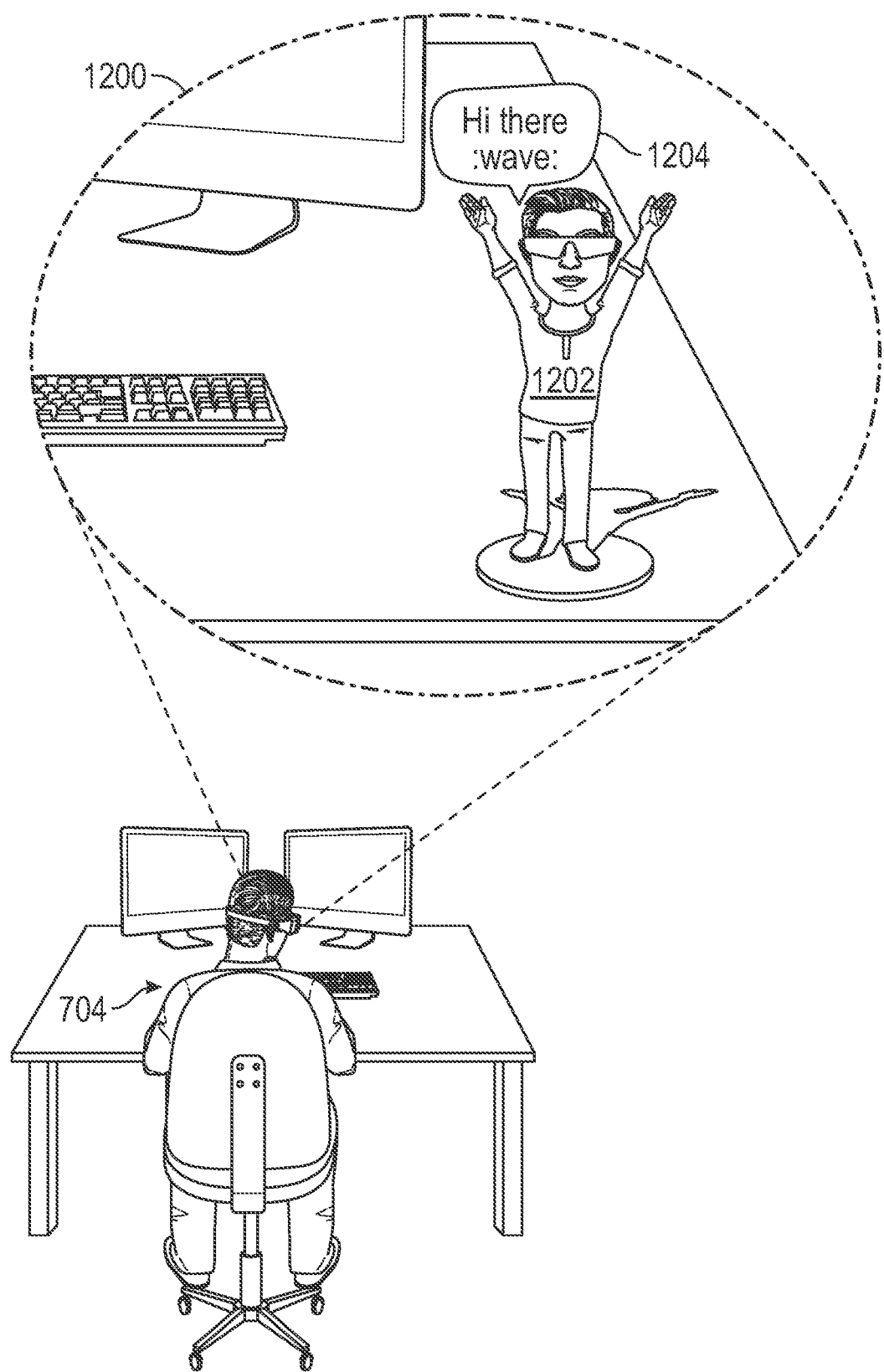
FIG. 12 is a diagram illustrating an example of an end-user wearing an AR device that is presenting to the end-user an avatar performing an avatar animation as a result of processing a message element included with a message, according to some examples.

As illustrated in FIG. 12, when the AR device 704 worn by the end-user receives the text-based message, instructions received with the text-based message are processed by the messaging application at the AR device 704, causing the 3-D avatar 1202 presented in the AR view 1200 to perform an avatar animation—for example, waving both arms. The text of the text-based message is also presented in a chat bubble 1204 proximate (e.g., next to, or near to) the 3-D avatar 1202. While FIG. 12 is merely a two-dimensional illustration, one might imagine the 3-D avatar waving his hands back in forth in accordance with the avatar animation. In some examples, the special command or emoji that maps to the avatar animation (e.g., ":wave:") will be presented with the text-based message in the chat bubble 1204. However, in other examples, only that part of the text-based message that is not determined to be a specific message element associated with an avatar animation will be presented.

After the second end-user wearing the AR device 704 receives a text-based message from the first end-user, the second end-user may desire to prepare and communicate a response message. Referring again to FIG. 7, at the operation with reference 726 the messaging application executing on the AR device 704 is continuously receiving and processing sensor data to analyze and track the real-world environment. Accordingly, if the second end-user wearing the AR device 704 looks in the direction of the 3-D avatar, the AR device 704 will process sensor data to determine that the AR device 704 is positioned and oriented, such that the end-user has the 3-D avatar directly in the end-user's line of sight. Based on this determination by the AR device 704, the messaging application will update the AR view presenting the 3-D avatar by adding a visual cue or marker of some type, indicating that the end-user is currently "targeting" the 3-D avatar, and that the audio recording device of the AR device is enabled, allowing the end-user to record a message to be communicated to the end-user, represented by the 3-D avatar. An example of the second end-user targeting the 3-D avatar of the first end-user is presented in FIG. 13.

Figure 13:
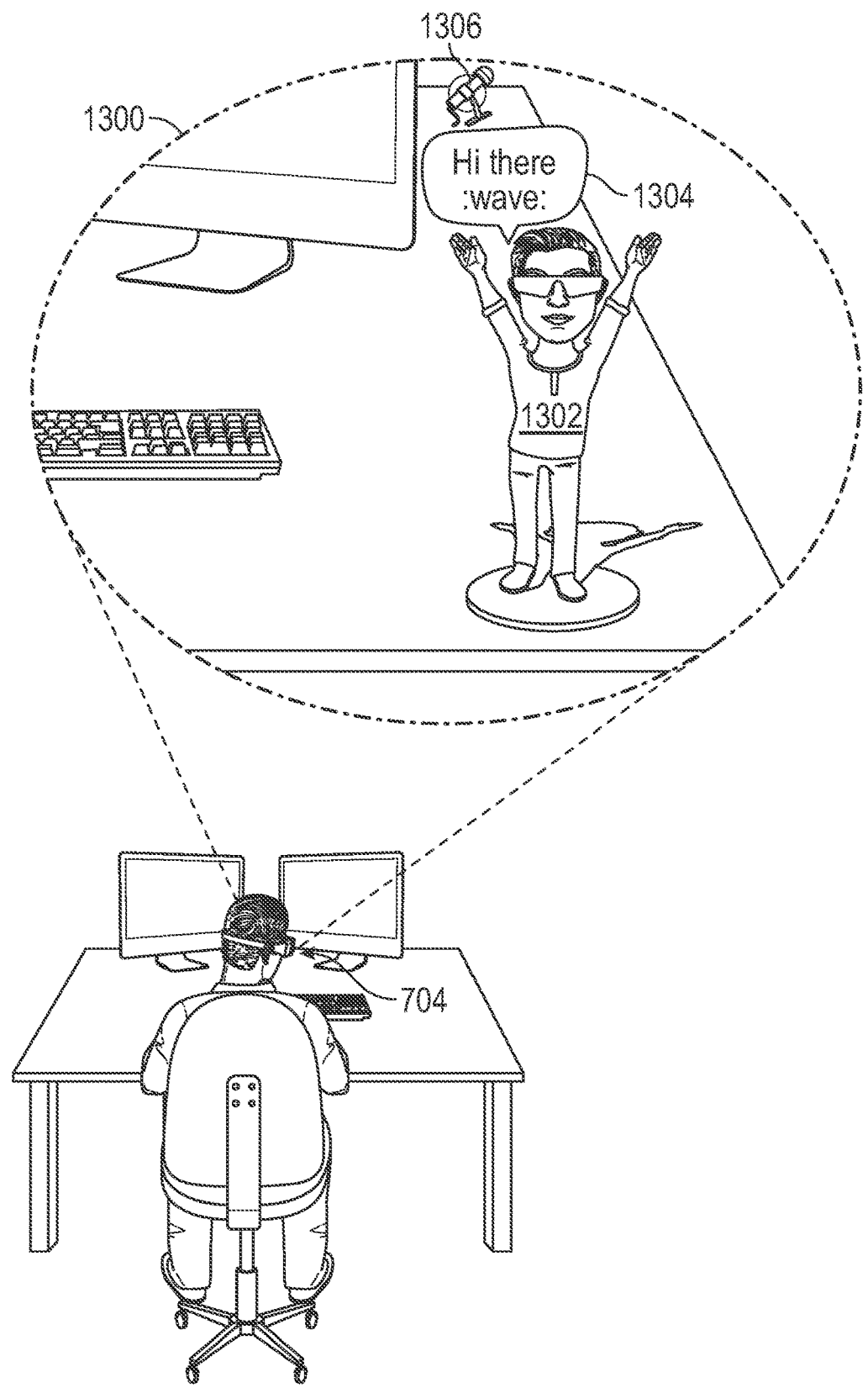
FIG. 13 is a diagram illustrating an example of an AR view and corresponding user interface, where the user interface includes an icon indicating an audio recording device has been enabled to capture audio input, consistent with some examples.

As illustrated in FIG. 13, the second end-user wearing the AR device 704 has turned his head to look at the position on the desktop where the second end-user previously anchored or pinned the 3-D avatar 1302. Accordingly, when the AR device 704 detects that the 3-D avatar 1302 is in a nearly directly line of sight of the second end-user, the messaging application executing at the AR device 704 updates the AR view to present above the chat bubble an icon, representing a microphone 1306. This presentation of the microphone 1306 is a visual indicator to the second end-user, informing the second end-user that the audio recording device (e.g., a built-in microphone) of the AR device 704 has been enabled, and is ready to record an audio message.

Referring again to FIG. 7, consistent with some examples, after a message has been recorded, the AR device 704 may convert the audio recording to a text-based message using a client-side speech-to-text algorithm. Then, the text-based message is communicated to the messaging system 706, where it is processed and relayed to its intended recipient(s). However, as some client-based AR devices may have limited processing capabilities, consistent with some examples, the audio recording may be communicated over the network to the messaging system 706, where the server-based messaging system processes the audio to create text-based message that is then communicated to the intended recipient(s).

Figure 14:
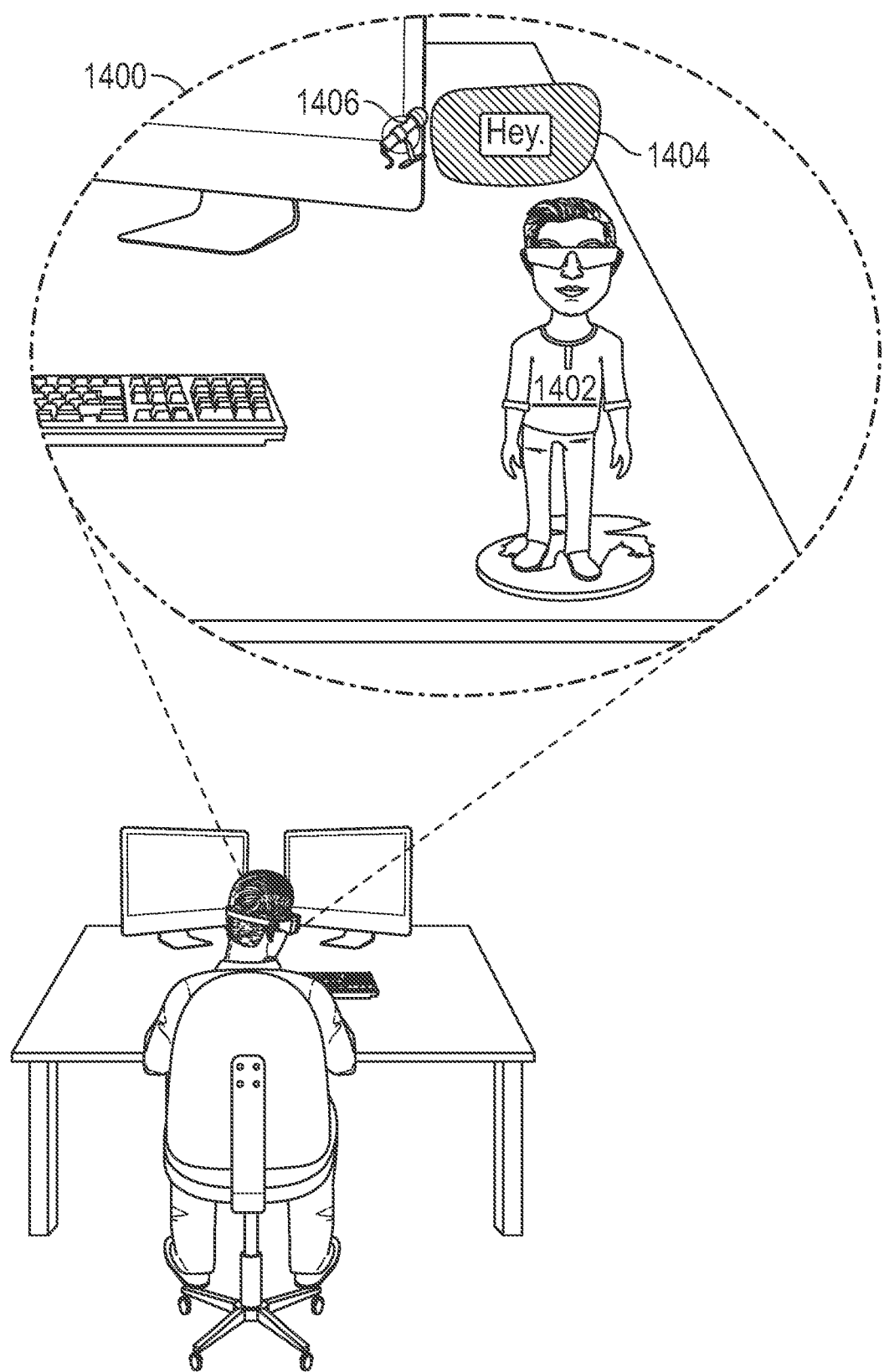
FIG. 14 is a diagram illustrating an example of an AR view that includes a user interface showing a text-based message that has been derived from audio captured with an audio input device, according to some examples.

As illustrated in FIG. 14, when the second end-user wearing the AR device 704 speaks an audible message that is captured or recorded by the AR device 704, the AR view 1400 presented by the AR device 704 may be updated to present the text-based version of the audible message. For instance, as shown in FIG. 12, after the first end-user sent a text-based message ("Hi there") 1204 to the second end-user, the second end-user has responded by recording an audio message, which has been translated to text and then presented in a separate chat bubble 1404. In some examples, the color of the chat bubbles may indicate the source of the text-based message. This may be configurable by the end-user. As shown in FIG. 14, the icon representing a microphone 1406 is presented next to the chat bubble 1404 to indicate that the microphone is currently enabled and the messaging application is prepared to capture audio for sending as a message. In some examples, the graphic or icon (e.g., the microphone) may have various versions or be presented in different colors, to indicate different states (e.g., disabled or enabled and ready to record, etc.)

In some examples, where two or more end-users are wearing AR devices, audio messages may be communicated between the devices without any conversion to text. Instead, each AR device may play the audio file so that the recipient hears the audible message, for example, through a built-in speaker, or similar device. In some examples, each messaging application provides a user interface with access to various configuration settings for the messaging system. Accordingly, an end-user may establish configuration settings that determine how messages are processed in specific scenarios. For instance, an end-user may be able to configurate a specific setting that ensures all messages are converted and provided as text-based messages, or alternatively, a specific setting may ensure that all messages are converted and provided as audible messages.

System with Wearable AR Device

Figure 15:
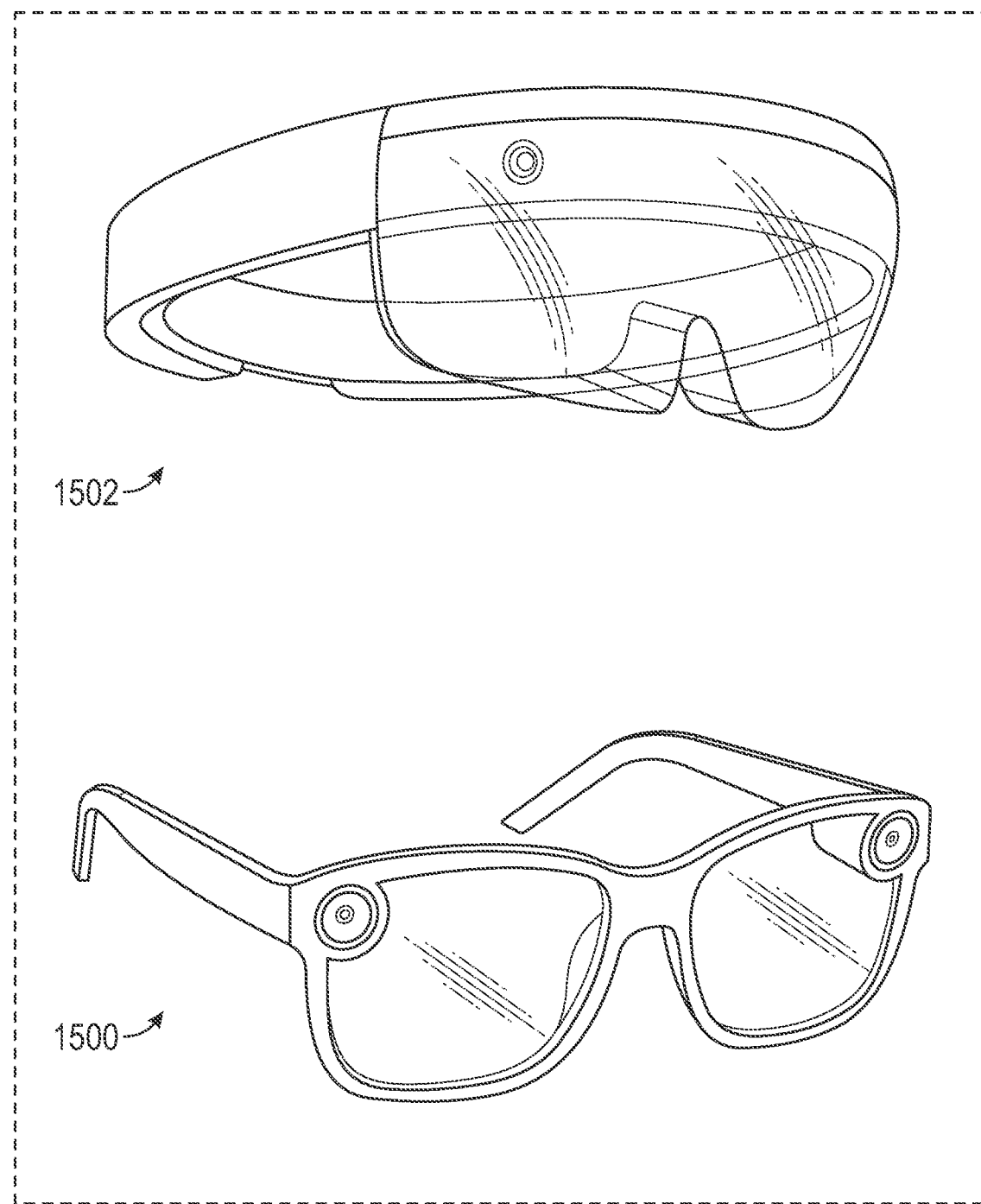
FIG. 15 is a diagram illustrating two different form factors for an AR device, including AR glasses, and an AR headset, consistent with some examples.

FIG. 15 illustrates an example of two AR devices, each having a different form factor. As will be appreciated by those skilled in the art, AR devices may have a variety of different form factors. In some examples, the various component parts of the AR device are built into a pair of glasses 1500, frequently referred to as smart glasses or AR glasses. In other examples, an AR device may be more substantial than a pair of glasses, and thus be referred to as an AR headset 1502. While not shown in FIG. 15, in yet other examples, the various component parts that make enable the AR experience may be built into a hat, a helmet, or a protective face covering.

Figure 16:
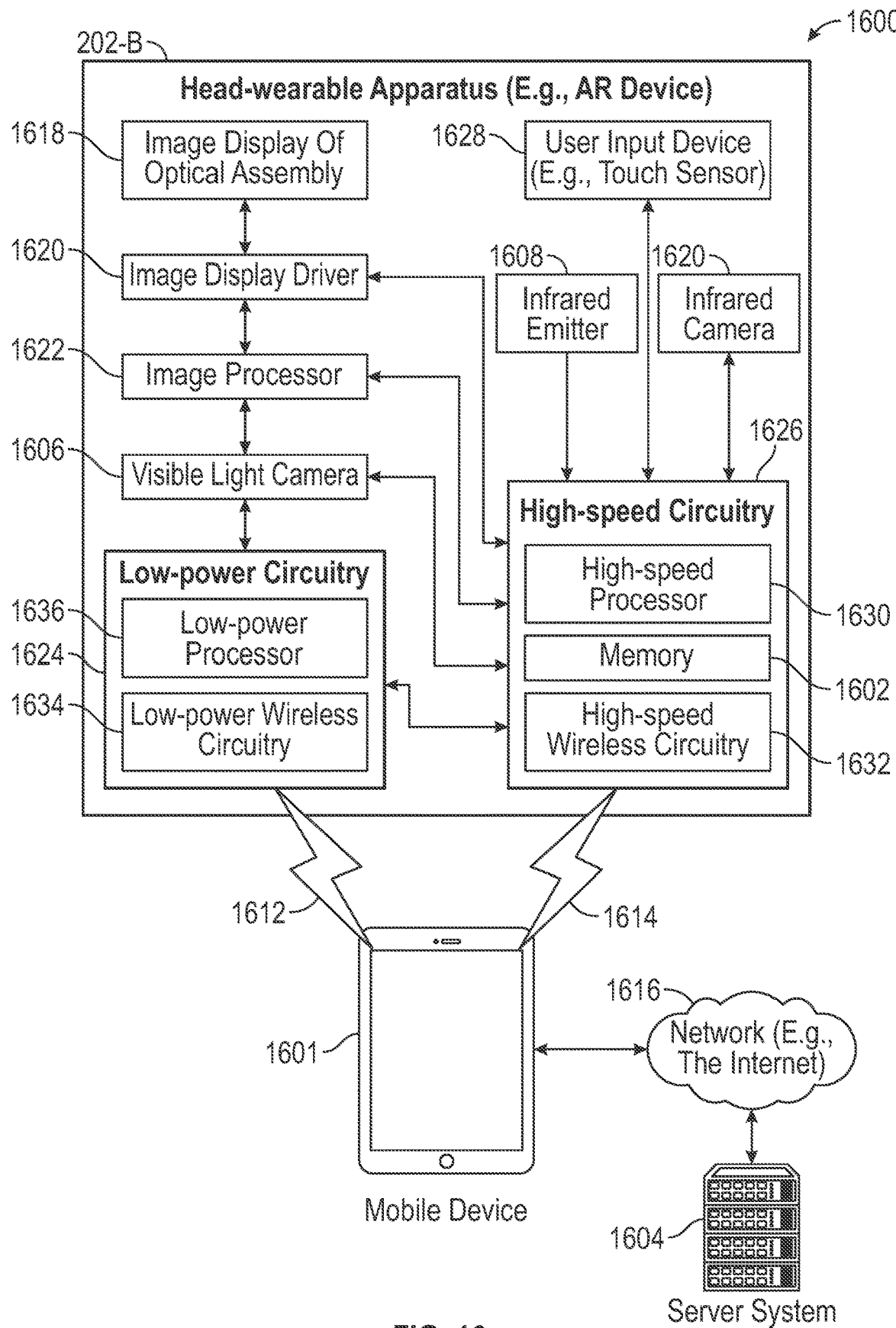
FIG. 16 illustrates a system including a user system, which in this example is a head-wearable apparatus or AR device, with a selector input device, according to some examples.

FIG. 16 illustrates a system 1600 including a user system, which in this example is a head-wearable apparatus or AR device, with a selector input device, according to some examples. FIG. 16 is a high-level functional block diagram of an example AR device 202-B communicatively coupled to a mobile device 1602 and various server systems 1604 (e.g., the interaction server system 212) via various networks 1616.

The AR device 202-B includes one or more cameras, each of which may be, for example, a visible light camera 1606, an infrared emitter 1608, and an infrared camera 1610.

The mobile device 1602 connects with AR device 202-B using both a low-power wireless connection 1612 and a high-speed wireless connection 1614. The mobile device 1602 is also connected to the server system 1604 and the network 1616.

The AR device 202-B further includes two display devices, or image displays of the image display of optical assembly 1618. The two image displays of optical assembly 1618 include one associated with the left lateral side and one associated with the right lateral side of the AR device 202-B. The AR device 202-B also includes an image display driver 1620, an image processor 1622, low-power circuitry 1624, and high-speed circuitry 1626. The image display of optical assembly 1618 is for presenting images and videos (e.g., avatars, and animated avatars), including an image that can include a graphical user interface to a user of the AR device 202-B.

The image display driver 1620 commands and controls the image display of optical assembly 1618. The image display driver 1620 may deliver image data directly to the image display of optical assembly 1618 for presentation or may convert the image data into a signal or data format suitable for delivery to the image display device. For example, the image data may be video data formatted according to compression formats, such as H.264 (MPEG-4 Part 10), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (EXIF) or the like.

The AR device 202-B includes a frame and stems (or temples) extending from a lateral side of the frame. The AR device 202-B further includes a user input device 1628 (e.g., touch sensor or push button), including an input surface on the AR device 202-B. The user input device 1628 (e.g., touch sensor or push button) is to receive from the user an input selection to manipulate the graphical user interface of the presented image.

The components shown in FIG. 16 for the AR device 202-B are located on one or more circuit boards, for example a PCB or flexible PCB, in the rims or temples. Alternatively, or additionally, the depicted components can be located in the chunks, frames, hinges, or bridge of the AR device 202-B. Left and right visible light cameras 506 can include digital camera elements such as a complementary metal oxide-semiconductor (CMOS) image sensor, charge-coupled device, camera lenses, or any other respective visible or light-capturing elements that may be used to capture data, including images of scenes with unknown objects.

The AR device 202-B includes a memory 1602, which stores instructions to perform a subset, or all of the functions described herein. The memory 1602 can also include storage device.

As shown in FIG. 16, the high-speed circuitry 1626 includes a high-speed processor 1630, a memory 1602, and high-speed wireless circuitry 1632. In some examples, the image display driver 1620 is coupled to the high-speed circuitry 1626 and operated by the high-speed processor 1630 in order to drive the left and right image displays of the image display of optical assembly 1628. The high-speed processor 1630 may be any processor capable of managing high-speed communications and operation of any general computing system needed for the AR device 202-B. The high-speed processor 1630 includes processing resources needed for managing high-speed data transfers on a high-speed wireless connection 1614 to a wireless local area network (WLAN) using the high-speed wireless circuitry 1632. In certain examples, the high-speed processor 1630 executes an operating system such as a LINUX operating system or other such operating system of the AR device 292-B, and the operating system is stored in the memory 1602 for execution. In addition to any other responsibilities, the high-speed processor 1620 executing a software architecture for the AR device 202-B is used to manage data transfers with high-speed wireless circuitry 1632. In certain examples, the high-speed wireless circuitry 1632 is configured to implement Institute of Electrical and Electronic Engineers (IEEE) 802.11 communication standards, also referred to herein as WI-FI®. In some examples, other high-speed communications standards may be implemented by the high-speed wireless circuitry 1632.

The low-power wireless circuitry 1634 and the high-speed wireless circuitry 1632 of the AR device 202-B can include short-range transceivers (Bluetooth™) and wireless wide, local, or wide area network transceivers (e.g., cellular or WI-FI®). Mobile device 202-B, including the transceivers communicating via the low-power wireless connection 1612 and the high-speed wireless connection 1614, may be implemented using details of the architecture of the AR device 202-B, as can other elements of the network 1616.

The memory 1602 includes any storage device capable of storing various data and applications, including, among other things, camera data generated by the left and right visible light cameras 1606, the infrared camera 1610, and the image processor 1622, as well as images generated for display by the image display driver 1620 on the image displays of the image display of optical assembly 1618. While the memory 1602 is shown as integrated with high-speed circuitry 1626, in some examples, the memory 1602 may be an independent standalone element of the AR device 202-B. In certain such examples, electrical routing lines may provide a connection through a chip that includes the high-speed processor 530 from the image processor 1622 or the low-power processor 1636 to the memory 1602. In some examples, the high-speed processor 1630 may manage addressing of the memory 1602 such that the low-power processor 1636 will boot the high-speed processor 1630 any time that a read or write operation involving memory 1602 is needed.

As shown in FIG. 16, the low-power processor 1636 or high-speed processor 1630 of the AR device 202-B can be coupled to the camera (visible light camera 1636, infrared emitter 1608, or infrared camera 1620), the image display driver 1620, the user input device 1628 (e.g., touch sensor or push button), and the memory 1602.

The AR device 202-B is connected to a host computer. For example, the AR device 202-B is paired with the mobile device 1601 via the high-speed wireless connection 1614 or connected to the server system 1604 via the network 1616. The server system 1604 may be one or more computing devices as part of a service or network computing system, for example, that includes a processor, a memory, and network communication interface to communicate over the network 1616 with the mobile device 1601 and the AR device 202-B.

The mobile device 1601 includes a processor and a network communication interface coupled to the processor. The network communication interface allows for communication over the network 516, low-power wireless connection 512, or high-speed wireless connection 514. Mobile device 1601 can further store at least portions of the instructions for generating binaural audio content in the mobile device 1601's memory to implement the functionality described herein.

Output components of the AR device 202-B include visual components, such as a display such as a liquid crystal display (LCD), a plasma display panel (PDP), a light-emitting diode (LED) display, a projector, or a waveguide. The image displays of the optical assembly are driven by the image display driver 520. The output components of the AR device 202-B further include acoustic components (e.g., speakers), haptic components (e.g., a vibratory motor), other signal generators, and so forth. The input components of the AR device 202-B, the mobile device 1601, and server system 504, such as the user input device 528, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The AR device 202-B may also include additional peripheral device elements. Such peripheral device elements may include biometric sensors, additional sensors, or display elements integrated with the AR device 202-B. For example, peripheral device elements may include any I/O components including output components, motion components, position components, or any other such elements described herein.

For example, the biometric components include components to detect expressions (e.g., hand expressions, facial expressions, vocal expressions, body gestures, or eye-tracking), measure bio-signals (e.g., blood pressure, heart rate, body temperature, perspiration, or brain waves), identify a person (e.g., voice identification, retinal identification, facial identification, fingerprint identification, or electroencephalogram-based identification), and the like. The biometric components may include a brain-machine interface (BMI) system that allows communication between the brain and an external device or machine. This may be achieved by recording brain activity data, translating this data into a format that can be understood by a computer, and then using the resulting signals to control the device or machine.

Example types of BMI technologies, including:
Electroencephalography (EEG) based BMIs, which record electrical activity in the brain using electrodes placed on the scalp.
Invasive BMIs, which used electrodes that are surgically implanted into the brain.
Optogenetics BMIs, which use light to control the activity of specific nerve cells in the brain.

Any biometric data collected by the biometric components is captured and stored with only user approval and deleted on user request. Further, such biometric data may be used for very limited purposes, such as identification verification. To ensure limited and authorized use of biometric information and other personally identifiable information (PII), access to this data is restricted to authorized personnel only, if at all. Any use of biometric data may strictly be limited to identification verification purposes, and the biometric data is not shared or sold to any third party without the explicit consent of the user. In addition, appropriate technical and organizational measures are implemented to ensure the security and confidentiality of this sensitive information.

The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), Wi-Fi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over low-power wireless connections 512 and high-speed wireless connection 514 from the mobile device 1601 via the low-power wireless circuitry 534 or high-speed wireless circuitry 532.

Software Architecture

Figure 17:
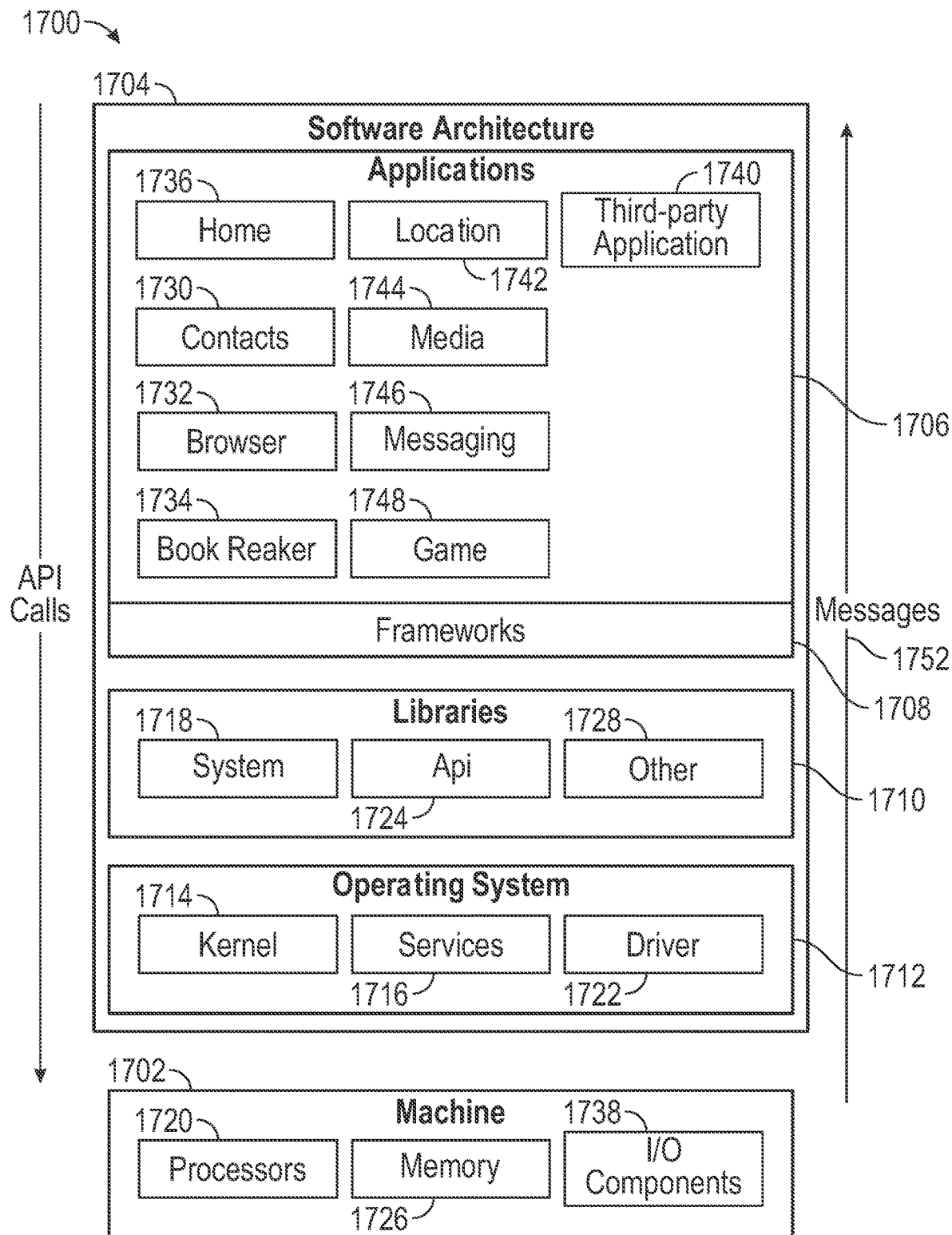
FIG. 17 is a block diagram illustrating a software architecture, which can be installed on any one or more of the devices described herein.

FIG. 17 is a block diagram 1700 illustrating a software architecture 1702, which can be installed on any one or more of the devices described herein. The software architecture 1702 is supported by hardware such as a machine 1704 that includes processors 1706, memory 1708, and I/O components 1710. In this example, the software architecture 1702 can be conceptualized as a stack of layers, where each layer provides a particular functionality. The software architecture 1702 includes layers such as an operating system 1712, libraries 1714, frameworks 1716, and applications 1718. Operationally, the applications 1718 invoke API calls 1720 through the software stack and receive messages 1722 in response to the API calls 1720.

The operating system 1712 manages hardware resources and provides common services. The operating system 1712 includes, for example, a kernel 1724, services 1726, and drivers 1728. The kernel 1724 acts as an abstraction layer between the hardware and the other software layers. For example, the kernel 1724 provides memory management, processor management (e.g., scheduling), component management, networking, and security settings, among other functionalities. The services 1726 can provide other common services for the other software layers. The drivers 1728 are responsible for controlling or interfacing with the underlying hardware. For instance, the drivers 1728 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1714 provide a common low-level infrastructure used by the applications 1718. The libraries 1714 can include system libraries 1730 (e.g., C standard library) that provide functions such as memory allocation functions, string manipulation functions, mathematic functions, and the like. In addition, the libraries 1714 can include API libraries 1732 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3-D) in a graphic content on a display), database libraries (e.g., SQLite to provide various relational database functions), web libraries (e.g., WebKit to provide web browsing functionality), and the like. The libraries 1714 can also include a wide variety of other libraries 734 to provide many other APIs to the applications 1718.

The frameworks 1716 provide a common high-level infrastructure that is used by the applications 1718. For example, the frameworks 1716 provide various graphical user interface (GUI) functions, high-level resource management, and high-level location services. The frameworks 1716 can provide a broad spectrum of other APIs that can be used by the applications 1718, some of which may be specific to a particular operating system or platform.

In an example, the applications 1718 may include a home application 1736, a contacts application 1738, a browser application 1740, a book reader application 1742, a location application 1744, a media application 1746, a messaging application 1748, a game application 1750, and a broad assortment of other applications such as a third-party application 1752. The applications 1718 are programs that execute functions defined in the programs. Various programming languages can be employed to create one or more of the applications 1718, structured in a variety of manners, such as object-oriented programming languages (e.g., Objective-C, Java, or C++) or procedural programming languages (e.g., C or assembly language). In a specific example, the third-party application 1752 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1752 can invoke the API calls 1720 provided by the operating system 1712 to facilitate functionalities described herein.

Machine Architecture

Figure 18:
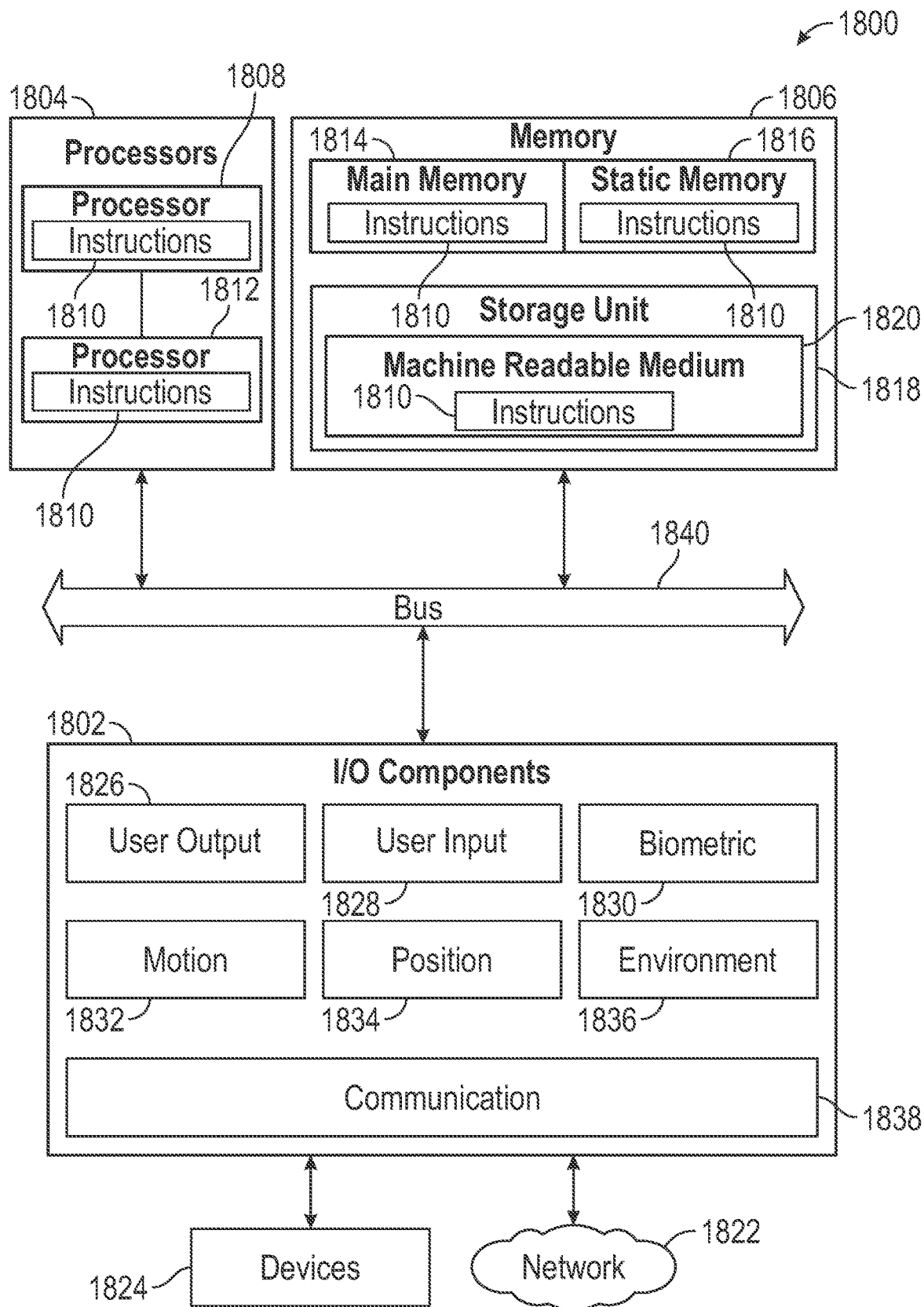
FIG. 18 is a diagrammatic representation of a machine in the form of a computer system within which a set of instructions may be executed to cause the machine to perform any one or more of the methodologies discussed herein, according to some examples.

FIG. 18 is a diagrammatic representation of the machine 1800 within which instructions 1802 (e.g., software, a program, an application, an applet, an app, or other executable code) for causing the machine 1800 to perform any one or more of the methodologies discussed herein may be executed. For example, the instructions 1802 may cause the machine 1800 to execute any one or more of the methods described herein. The instructions 1802 transform the general, non-programmed machine 1800 into a particular machine 1800 programmed to carry out the described and illustrated functions in the manner described. The machine 1800 may operate as a standalone device or may be coupled (e.g., networked) to other machines. In a networked deployment, the machine 1800 may operate in the capacity of a server machine or a client machine in a server-client network environment, or as a peer machine in a peer-to-peer (or distributed) network environment. The machine 1800 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1802, sequentially or otherwise, that specify actions to be taken by the machine 1800. Further, while a single machine 1800 is illustrated, the term "machine" shall also be taken to include a collection of machines that individually or jointly execute the instructions 1802 to perform any one or more of the methodologies discussed herein. The machine 1800, for example, may comprise the user system 102 or any one of multiple server devices forming part of the interaction server system 110. In some examples, the machine 1800 may also comprise both client and server systems, with certain operations of a particular method or algorithm being performed on the server-side and with certain operations of the particular method or algorithm being performed on the client-side.

The machine 1800 may include processors 1804, memory 1806, and input/output I/O components 1808, which may be configured to communicate with each other via a bus 1810. In an example, the processors 1804 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1812 and a processor 1814 that execute the instructions 1802. The term "processor" is intended to include multi-core processors that may comprise two or more independent processors (sometimes referred to as "cores") that may execute instructions contemporaneously. Although FIG. 18 shows multiple processors 1804, the machine 1800 may include a single processor with a single core, a single processor with multiple cores (e.g., a multi-core processor), multiple processors with a single core, multiple processors with multiples cores, or any combination thereof.

The memory 1806 includes a main memory 1816, a static memory 1818, and a storage unit 1820, both accessible to the processors 1804 via the bus 1810. The main memory 1806, the static memory 1818, and storage unit 1820 store the instructions 1802 embodying any one or more of the methodologies or functions described herein. The instructions 1802 may also reside, completely or partially, within the main memory 1816, within the static memory 1818, within machine-readable medium 1822 within the storage unit 1820, within at least one of the processors 1804 (e.g., within the processor's cache memory), or any suitable combination thereof, during execution thereof by the machine 1800.

The I/O components 1808 may include a wide variety of components to receive input, provide output, produce output, transmit information, exchange information, capture measurements, and so on. The specific I/O components 1808 that are included in a particular machine will depend on the type of machine. For example, portable machines such as mobile phones may include a touch input device or other such input mechanisms, while a headless server machine will likely not include such a touch input device. It will be appreciated that the I/O components 1808 may include many other components that are not shown in FIG. 18. In various examples, the I/O components 1808 may include user output components 1824 and user input components 1826. The user output components 1824 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1826 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1808 may include biometric components 1828, motion components 1830, environmental components 1832, or position components 1834, among a wide array of other components. For example, the biometric components 1828 include components to detect expressions (e.g., hand expressions, facial expressions, vocal expressions, body gestures, or eye-tracking), measure bio-signals (e.g., blood pressure, heart rate, body temperature, perspiration, or brain waves), identify a person (e.g., voice identification, retinal identification, facial identification, fingerprint identification, or electroencephalogram-based identification), and the like. The biometric components may include a brain-machine interface (BMI) system that allows communication between the brain and an external device or machine. This may be achieved by recording brain activity data, translating this data into a format that can be understood by a computer, and then using the resulting signals to control the device or machine.

Example types of BMI technologies, including:
Electroencephalography (EEG) based BMIs, which record electrical activity in the brain using electrodes placed on the scalp.
Invasive BMIs, which used electrodes that are surgically implanted into the brain.
Optogenetics BMIs, which use light to control the activity of specific nerve cells in the brain.

Any biometric data collected by the biometric components is captured and stored only with user approval and deleted on user request. Further, such biometric data may be used for very limited purposes, such as identification verification. To ensure limited and authorized use of biometric information and other personally identifiable information (PII), access to this data is restricted to authorized personnel only, if at all. Any use of biometric data may strictly be limited to identification verification purposes, and the data is not shared or sold to any third party without the explicit consent of the user. In addition, appropriate technical and organizational measures are implemented to ensure the security and confidentiality of this sensitive information.

The motion components 1830 include acceleration sensor components (e.g., accelerometer), gravitation sensor components, rotation sensor components (e.g., gyroscope).

The environmental components 1832 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the user system 102 may have a camera system comprising, for example, front cameras on a front surface of the user system 102 and rear cameras on a rear surface of the user system 102. The front cameras may, for example, be used to capture still images and video of a user of the user system 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the user system 102 may also include a 360° camera for capturing 360° photographs and videos.

Further, the camera system of the user system 102 may include dual rear cameras (e.g., a primary camera as well as a depth-sensing camera), or even triple, quad or penta rear camera configurations on the front and rear sides of the user system 102. These multiple cameras systems may include a wide camera, an ultra-wide camera, a telephoto camera, a macro camera, and a depth sensor, for example.

The position components 1834 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1808 further include communication components 1836 operable to couple the machine 1800 to a network 1838 or devices 1840 via respective coupling or connections. For example, the communication components 1836 may include a network interface component or another suitable device to interface with the network 1838. In further examples, the communication components 1836 may include wired communication components, wireless communication components, cellular communication components, Near Field Communication (NFC) components, Bluetooth® components (e.g., Bluetooth® Low Energy), Wi-FiR components, and other communication components to provide communication via other modalities. The devices 1840 may be another machine or any of a wide variety of peripheral devices (e.g., a peripheral device coupled via a USB).

Moreover, the communication components 1836 may detect identifiers or include components operable to detect identifiers. For example, the communication components 1836 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph™, MaxiCode, PDF417, Ultra Code, UCC RSS-2D bar code, and other optical codes), or acoustic detection components (e.g., microphones to identify tagged audio signals). In addition, a variety of information may be derived via the communication components 1836, such as location via Internet Protocol (IP) geolocation, location via Wi-Fi® signal triangulation, location via detecting an NFC beacon signal that may indicate a particular location, and so forth.

The various memories (e.g., main memory 1816, static memory 1818, and memory of the processors 1804) and storage unit 1820 may store one or more sets of instructions and data structures (e.g., software) embodying or used by any one or more of the methodologies or functions described herein. These instructions (e.g., the instructions 1802), when executed by processors 1804, cause various operations to implement the disclosed examples.

The instructions 1802 may be transmitted or received over the network 1838, using a transmission medium, via a network interface device (e.g., a network interface component included in the communication components 1836) and using any one of several well-known transfer protocols (e.g., hypertext transfer protocol (HTTP)). Similarly, the instructions 1802 may be transmitted or received using a transmission medium via a coupling (e.g., a peer-to-peer coupling) to the devices 1840.

Examples

Example 1 is a system providing a messaging service, the system comprising: at least one processor; a memory storage device storing instructions that, when executed by a processor, cause the system to perform operations comprising: receiving a message from a computing device of a first end-user, the message addressed to a second end-user; processing the message by: determining that the second end-user has a status indicating that the second end-user is online with the messaging service via an augmented reality (AR) device that is located in a real-world space associated with an AR space in which the second end-user has anchored a 3D avatar representing the first end-user; determining that a message element received with the message is associated with an avatar animation; and sending data to the AR device of the second end-user that, when processed by a messaging application executing at the AR device, will cause the messaging application to present, via a user interface on a display of the AR device, the 3D avatar performing the avatar animation.

In Example 2, the subject matter of Example 1 includes, D avatar representing the first end-user, when presented in the user interface on the display of the AR device, is rendered with an appearance consistent with avatar configuration data specified by the first end-user.

In Example 3, the subject matter of Examples 1-2 includes, wherein the avatar animation is a human-like movement comprising: a pose, a facial expression, a gesture, an action performed with a prop, or any combination thereof.

In Example 4, the subject matter of Examples 1-3 includes, wherein the message element received with the message is an emoji, and determining that the message element received with the message is associated with an avatar animation comprises: querying, with the emoji, a data structure that maps each emoji of a plurality of emojis to a corresponding avatar animation, wherein an indication of the avatar animation is returned as a result of said querying.

In Example 5, the subject matter of Examples 1~4 includes, wherein the message element received with the message is a combination of two or more characters and determining that the message element received with the message is associated with an avatar animation comprises: querying, with the combination of two or more characters, a data structure that maps each combination of two or more characters of a plurality of combinations of two or more characters to a corresponding avatar animation, wherein an indication of the avatar animation is returned as a result of said querying.

In Example 6, the subject matter of Examples 1-5 includes, wherein the instructions, when executed by the processor, cause the system to perform further operations comprising: processing the message by: sending data to the AR device of the second end-user that, when processed by the messaging application executing at the AR device, will cause the messaging application to present text, included with the message, in a chat bubble positioned proximate to the presentation of the 3D avatar performing the avatar animation.

In Example 7, the subject matter of Examples 1-6 includes, wherein the instructions, when executed by the processor, cause the system to perform further operations comprising: processing the message by: with a text-to-speech algorithm, generating an audio clip from text included with the message; and sending data and the audio clip to the AR device of the second end-user that, when processed by the messaging application executing at the AR device, will cause the messaging application to play the audio clip, output via a speaker of the AR device, during presentation of the 3D avatar performing the avatar animation.

In Example 8, the subject matter of Examples 1-7 includes, wherein the instructions, when executed by the processor, cause the system to perform further operations comprising: prior to receiving the message from the computing device of the first end-user: receiving data from the messaging application executing at the AR device, the data indicating that the second end-user is online with the messaging service via an augmented reality (AR) device that is located in a real-world space associated with an AR space in which the second end-user has anchored a 3D avatar representing the first end-user; updating the status of the second end-user to indicate that the second end-user is online with the messaging service via an augmented reality (AR) device that is located in a real-world space associated with an AR space in which the second end-user has anchored a 3D avatar representing the first end-user; and communicating data to the computing device of the first end-user that, when processed by the computing device, will cause a presence indicator to be presented via a user interface on a display of the computing device, the presence indicator indicating the status of the second end-user.

In Example 9, the subject matter of Example 8 includes, wherein the instructions, when executed by the processor, cause the system to perform further operations comprising: prior to receiving the message from the computing device of the first end-user: communicating data to the computing device of the first end-user that, when processed by the computing device, will cause a user interface to be presented via a display of the computing device, the user interface presenting a plurality of icons, with each icon representing an avatar animation, wherein selection of an icon by the first end-user will invoke a preview presentation of the 3D avatar performing an avatar animation corresponding with the selected icon.

Example 10 is a computer-implemented method performed by one or more server computers providing a messaging service, the method comprising: receiving a message from a computing device of a first end-user, the message addressed to a second end-user; processing the message, by: determining that the second end-user has a status indicating that the second end-user is online with the messaging service via an augmented reality (AR) device that is located in a real-world space associated with an AR space in which the second end-user has anchored a 3D avatar representing the first end-user; determining that a message element received with the message is associated with an avatar animation; and sending data to the AR device of the second end-user that, when processed by a messaging application executing at the AR device, will cause the messaging application to present, via a user interface on a display of the AR device, the 3D avatar performing the avatar animation.

In Example 11, the subject matter of Example 10 includes, D avatar representing the first end-user, when presented in the user interface on the display of the AR device, is rendered with an appearance consistent with avatar configuration data specified by the first end-user.

In Example 12, the subject matter of Examples 10-11 includes, wherein the avatar animation is a human-like movement comprising: a pose, a facial expression, a gesture, an action performed with a prop, or any combination thereof.

In Example 13, the subject matter of Examples 10-12 includes, wherein the message element received with the message is an emoji, and determining that the message element received with the message is associated with an avatar animation comprises: querying, with the emoji, a data structure that maps each emoji of a plurality of emojis to a corresponding avatar animation, wherein an indication of the avatar animation is returned as a result of said querying.

In Example 14, the subject matter of Examples 10-13 includes, wherein the message element received with the message is a combination of two or more characters and determining that the message element received with the message is associated with an avatar animation comprises: querying, with the combination of two or more characters, a data structure that maps each combination of two or more characters of a plurality of combinations of two or more characters to a corresponding avatar animation, wherein an indication of the avatar animation is returned as a result of said querying.

In Example 15, the subject matter of Examples 10-14 includes, wherein the instructions, when executed by the processor, cause the system to perform further operations comprising: processing the message, by: sending data to the AR device of the second end-user that, when processed by the messaging application executing at the AR device, will cause the messaging application to present text, included with the message, in a chat bubble positioned proximate to the presentation of the 3D avatar performing the avatar animation.

In Example 16, the subject matter of Examples 10-15 includes, wherein the instructions, when executed by the processor, cause the system to perform further operations comprising: processing the message, by: with a text-to-speech algorithm, generating an audio clip from text included with the message; and sending data and the audio clip to the AR device of the second end-user that, when processed by the messaging application executing at the AR device, will cause the messaging application to play the audio clip, output via a speaker of the AR device, during presentation of the 3D avatar performing the avatar animation.

In Example 17, the subject matter of Examples 10-16 includes, wherein the instructions, when executed by the processor, cause the system to perform further operations comprising: prior to receiving the message from the computing device of the first end-user: receiving data from the messaging application executing at the AR device, the data indicating that the second end-user is online with the messaging service via an augmented reality (AR) device that is located in a real-world space associated with an AR space in which the second end-user has anchored a 3D avatar representing the first end-user; updating the status of the second end-user to indicate that the second end-user is online with the messaging service via an augmented reality (AR) device that is located in a real-world space associated with an AR space in which the second end-user has anchored a 3D avatar representing the first end-user; and communicating data to the computing device of the first end-user that, when processed by the computing device, will cause a presence indicator to be presented via a user interface on a display of the computing device, the presence indicator indicating the status of the second end-user.

In Example 18, the subject matter of Example 17 includes, wherein the instructions, when executed by the processor, cause the system to perform further operations comprising: prior to receiving the message from the computing device of the first end-user: communicating data to the computing device of the first end-user that, when processed by the computing device, will cause a user interface to be presented via a display of the computing device, the user interface presenting a plurality of icons, with each icon representing an avatar animation, wherein selection of an icon by the first end-user will invoke a preview presentation of the 3D avatar performing an avatar animation corresponding with the selected icon.

Example 19 is a system comprising: means for receiving a message from a computing device of a first end-user, the message addressed to a second end-user; means for processing the message, by: determining that the second end-user has a status indicating that the second end-user is online with the messaging service via an augmented reality (AR) device that is located in a real-world space associated with an AR space in which the second end-user has anchored a 3D avatar representing the first end-user; determining that a message element received with the message is associated with an avatar animation; and sending data to the AR device of the second end-user that, when processed by a messaging application executing at the AR device, will cause the messaging application to present, via a user interface on a display of the AR device, the 3D avatar performing the avatar animation.

In Example 20, the subject matter of Example 19 includes, wherein the message element received with the message is an emoji, and said means for processing the message by determining that the message element received with the message is associated with an avatar animation additionally comprises: means for querying, with the emoji, a data structure that maps each emoji of a plurality of emojis to a corresponding avatar animation, wherein an indication of the avatar animation is returned as a result of said querying.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Glossary

"Carrier signal" refers, for example, to any intangible medium that is capable of storing, encoding, or carrying instructions for execution by the machine and includes digital or analog communications signals or other intangible media to facilitate communication of such instructions. Instructions may be transmitted or received over a network using a transmission medium via a network interface device.

"Client device" refers, for example, to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers, for example, to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers, for example, to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers, for example, to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers, for example, to a message that is accessible for a time-limited duration. An ephemeral message may be a text, an image, a video and the like. The access time for the ephemeral message may be set by the message sender. Alternatively, the access time may be a default setting, or a setting specified by the recipient. Regardless of the setting technique, the message is transitory.

"Machine storage medium" refers, for example, to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers, for example, to a tangible medium that is capable of storing, encoding, or carrying the instructions for execution by a machine.

"Signal medium" refers, for example, to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

"User device" refers, for example, to a device accessed, controlled or owned by a user and with which the user interacts perform an action or interaction on the user device, including an interaction with other users or computer systems.

What is claimed is:

1. A system providing a messaging service, the system comprising:
   at least one processor;
   a memory storage device storing instructions that, when executed by a processor, cause the system to perform operations comprising:
   receiving a message from a computing device of a first end-user, the message addressed to a second end-user;
   processing the message by:
   determining that the second end-user has a status indicating that the second end-user is online with the messaging service via an augmented reality (AR) device that is located in a real-world space associated with an AR space in which the second end-user has anchored a 3D avatar representing the first end-user;
   determining that a message element received with the message is associated with an avatar animation; and
   responsive to determining that the second end-user has the status and that the message element is associated with an avatar animation, sending data to the AR device of the second end-user that, when processed by a messaging application executing at the AR device, will cause the messaging application to present, via a user interface on a display of the AR device, the 3D avatar performing the avatar animation.

2. The system of claim 1, wherein the 3D avatar representing the first end-user, when presented in the user interface on the display of the AR device, is rendered with an appearance consistent with avatar configuration data specified by the first end-user.

3. The system of claim 1, wherein the avatar animation is a human-like movement comprising:
   a pose, a facial expression, a gesture, an action performed with a prop, or any combination thereof.

4. The system of claim 1, wherein the message element received with the message is an emoji, and determining that the message element received with the message is associated with an avatar animation comprises:
   querying, with the emoji, a data structure that maps each emoji of a plurality of emojis to a corresponding avatar animation, wherein an indication of the avatar animation is returned as a result of said querying.

5. The system of claim 1, wherein the message element received with the message is a combination of two or more characters and determining that the message element received with the message is associated with an avatar animation comprises:
   querying, with the combination of two or more characters, a data structure that maps each combination of two or more characters of a plurality of combinations of two or more characters to a corresponding avatar animation, wherein an indication of the avatar animation is returned as a result of said querying.

6. The system of claim 1, wherein the instructions, when executed by the processor, cause the system to perform further operations comprising:
   processing the message by:
   sending data to the AR device of the second end-user that, when processed by the messaging application executing at the AR device, will cause the messaging application to present text, included with the message, in a chat bubble positioned proximate to the presentation of the 3D avatar performing the avatar animation.

7. The system of claim 1, wherein the instructions, when executed by the processor, cause the system to perform further operations comprising:

processing the message by:
with a text-to-speech algorithm, generating an audio clip from text included with the message; and
sending data and the audio clip to the AR device of the second end-user that, when processed by the messaging application executing at the AR device, will cause the messaging application to play the audio clip, output via a speaker of the AR device, during presentation of the 3D avatar performing the avatar animation.

8. The system of claim 1, wherein the instructions, when executed by the processor, cause the system to perform further operations comprising:
prior to receiving the message from the computing device of the first end-user:
receiving data from the messaging application executing at the AR device, the data indicating that the second end-user is online with the messaging service via an augmented reality (AR) device that is located in a real-world space associated with an AR space in which the second end-user has anchored a 3D avatar representing the first end-user;
updating the status of the second end-user to indicate that the second end-user is online with the messaging service via an augmented reality (AR) device that is located in a real-world space associated with an AR space in which the second end-user has anchored a 3D avatar representing the first end-user; and
communicating data to the computing device of the first end-user that, when processed by the computing device, will cause a presence indicator to be presented via a user interface on a display of the computing device, the presence indicator indicating the status of the second end-user.

9. The system of claim 8, wherein the instructions, when executed by the processor, cause the system to perform further operations comprising:
prior to receiving the message from the computing device of the first end-user:
communicating data to the computing device of the first end-user that, when processed by the computing device, will cause a user interface to be presented via a display of the computing device, the user interface presenting a plurality of icons, with each icon representing an avatar animation, wherein selection of an icon by the first end-user will invoke a preview presentation of the 3D avatar performing an avatar animation corresponding with the selected icon.

10. A computer-implemented method performed by one or more server computers providing a messaging service, the method comprising:
receiving a message from a computing device of a first end-user, the message addressed to a second end-user;
processing the message, by:
determining that the second end-user has a status indicating that the second end-user is online with the messaging service via an augmented reality (AR) device that is located in a real-world space associated with an AR space in which the second end-user has anchored a 3D avatar representing the first end-user;
determining that a message element received with the message is associated with an avatar animation; and
responsive to determining that the second end-user has the status and that the message element is associated with an avatar animation, sending data to the AR device of the second end-user that, when processed by a messaging application executing at the AR device, will cause the messaging application to present, via a user interface on a display of the AR device, the 3D avatar performing the avatar animation.

11. The computer-implemented method of claim 10, wherein the 3D avatar representing the first end-user, when presented in the user interface on the display of the AR device, is rendered with an appearance consistent with avatar configuration data specified by the first end-user.

12. The computer-implemented of claim 10, wherein the avatar animation is a human-like movement comprising:
a pose, a facial expression, a gesture, an action performed with a prop, or any combination thereof.

13. The computer-implemented of claim 10, wherein the message element received with the message is an emoji, and determining that the message element received with the message is associated with an avatar animation comprises:
querying, with the emoji, a data structure that maps each emoji of a plurality of emojis to a corresponding avatar animation, wherein an indication of the avatar animation is returned as a result of said querying.

14. The computer-implemented method of claim 10, wherein the message element received with the message is a combination of two or more characters and determining that the message element received with the message is associated with an avatar animation comprises:
querying, with the combination of two or more characters, a data structure that maps each combination of two or more characters of a plurality of combinations of two or more characters to a corresponding avatar animation, wherein an indication of the avatar animation is returned as a result of said querying.

15. The computer-implemented method of claim 10, wherein the method further comprises:
processing the message, by:
sending data to the AR device of the second end-user that, when processed by the messaging application executing at the AR device, will cause the messaging application to present text, included with the message, in a chat bubble positioned proximate to the presentation of the 3D avatar performing the avatar animation.

16. The computer-implemented method of claim 10, wherein the method further comprises:
processing the message, by:
with a text-to-speech algorithm, generating an audio clip from text included with the message; and
sending data and the audio clip to the AR device of the second end-user that, when processed by the messaging application executing at the AR device, will cause the messaging application to play the audio clip, output via a speaker of the AR device, during presentation of the 3D avatar performing the avatar animation.

17. The computer-implemented method of claim 10, wherein the method further comprises:
prior to receiving the message from the computing device of the first end-user:
receiving data from the messaging application executing at the AR device, the data indicating that the second end-user is online with the messaging service via an augmented reality (AR) device that is located in a real-world space associated with an AR space in which the second end-user has anchored a 3D avatar representing the first end-user;
updating the status of the second end-user to indicate that the second end-user is online with the messaging service via an augmented reality (AR) device that is located in a real-world space associated with an AR space in which the second end-user has anchored a 3D avatar representing the first end-user; and communicating data to the computing device of the first end-user that, when processed by the computing device, will cause a presence indicator to be presented via a user interface on a display of the computing device, the presence indicator indicating the status of the second end-user.

18. The method of claim 17, wherein the method further comprises:
prior to receiving the message from the computing device of the first end-user:
communicating data to the computing device of the first end-user that, when processed by the computing device, will cause a user interface to be presented via a display of the computing device, the user interface presenting a plurality of icons, with each icon representing an avatar animation, wherein selection of an icon by the first end-user will invoke a preview presentation of the 3D avatar performing an avatar animation corresponding with the selected icon.

19. A memory storage device storing instructions thereon, which, when executed by a processor, will cause a system to perform operation comprising:
receiving a message from a computing device of a first end-user, the message addressed to a second end-user;
processing the message, by:
determining that the second end-user has a status indicating that the second end-user is online with a messaging service via an augmented reality (AR) device that is located in a real-world space associated with an AR space in which the second end-user has anchored a 3D avatar representing the first end-user;
determining that a message element received with the message is associated with an avatar animation; and
responsive to determining that the second end-user has the status and that the message element is associated with an avatar animation, sending data to the AR device of the second end-user that, when processed by a messaging application executing at the AR device, will cause the messaging application to present, via a user interface on a display of the AR device, the 3D avatar performing the avatar animation.

20. The memory storage device of claim 19, wherein the message element received with the message is an emoji, and processing the message by determining that the message element received with the message is associated with an avatar animation additionally comprises:
querying, with the emoji, a data structure that maps each emoji of a plurality of emojis to a corresponding avatar animation, wherein an indication of the avatar animation is returned as a result of said querying.

* * * * *